US009973673B2

United States Patent
Ikeda

(10) Patent No.: US 9,973,673 B2
(45) Date of Patent: May 15, 2018

(54) IMAGE SIGNAL RECORDING/REPRODUCTION APPARATUS, METHOD EMPLOYED THEREIN, AND IMAGE SIGNAL RECORDING APPARATUS

(75) Inventor: Osamu Ikeda, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 268 days.

(21) Appl. No.: 13/479,659

(22) Filed: May 24, 2012

(65) Prior Publication Data

US 2012/0274797 A1 Nov. 1, 2012

Related U.S. Application Data

(63) Continuation of application No. 11/898,455, filed on Sep. 12, 2007, now abandoned, which is a (Continued)

(30) Foreign Application Priority Data

May 27, 1998 (JP) .................................... 10-145818
May 27, 1998 (JP) .................................... 10-145819

(51) Int. Cl.
*H04N 5/232* (2006.01)
*H04N 5/77* (2006.01)
(Continued)

(52) U.S. Cl.
CPC ......... *H04N 5/232* (2013.01); *H04N 5/23245* (2013.01); *H04N 5/772* (2013.01);
(Continued)

(58) Field of Classification Search
CPC ..... H04N 5/772; H04N 5/232; H04N 5/23245
(Continued)

(56) References Cited

U.S. PATENT DOCUMENTS 5,164,839 A 11/1992 Lang
5,404,316 A 4/1995 Klingler et al.
(Continued)

FOREIGN PATENT DOCUMENTS

EP 0700203 * 6/1996

OTHER PUBLICATIONS

Oct. 25, 2001 Office Action issued in U.S. Appl. No. 09/318,830.
Aug. 12, 2001 Office Action issued in U.S. Appl. No. 09/318,830.
Mar. 12, 2007 Office Action issued in U.S. Appl. No. 10/364,368.
Nov. 25, 2011 Office Action issued in U.S. Appl. No. 11/858,455.

*Primary Examiner* — Mishawn Hunter
(74) *Attorney, Agent, or Firm* — Oliff PLC

(57) ABSTRACT

An image signal recording/reproduction apparatus having a generating apparatus that generates a dynamic image signal or a still image signal of a subject captured by an imaging apparatus; an operation apparatus that starts recording of the dynamic image signal or the still image signal generated by the generating apparatus; a recording apparatus that records the dynamic image signal or the still image signal into a recording medium through mechanical drive; a reproduction apparatus that reproduces the dynamic image signal or the still image signal recorded at the recording medium through mechanical drive; and a control apparatus that implements control so that the mechanical drive is sustained if the operation apparatus is operated while the dynamic image signal or the still image signal is being reproduced by the reproduction apparatus and so that the recording apparatus records the dynamic image signal or the still image signal in the recording medium.

14 Claims, 20 Drawing Sheets

Related U.S. Application Data continuation of application No. 10/364,368, filed on Feb. 12, 2003, now abandoned, which is a continuation of application No. 09/318,830, filed on May 26, 1999, now abandoned.

(51) Int. Cl.
*H04N 5/85* (2006.01)
*H04N 9/79* (2006.01)
*H04N 9/806* (2006.01)
*H04N 9/82* (2006.01)

(52) U.S. Cl.
CPC ............ *H04N 5/85* (2013.01); *H04N 9/7921* (2013.01); *H04N 9/8063* (2013.01); *H04N 9/8227* (2013.01)

(58) Field of Classification Search
USPC ....... 386/210, 224, 225, 278, 285, 326, 329, 386/332; 348/220.1, 333.11
See application file for complete search history.

(56) References Cited

U.S. PATENT DOCUMENTS

| | | |
|---|---|---|
| 5,471,439 A | 11/1995 | Katayama et al. |
| 5,477,337 A | 12/1995 | Schuler |
| 5,513,306 A | 4/1996 | Mills et al. |
| 5,703,638 A * | 12/1997 | Ohta et al. .............. 348/220.1 |
| 5,719,985 A | 2/1998 | Ito et al. |
| 6,222,986 B1 | 4/2001 | Inuiya |
| 6,263,310 B1 | 7/2001 | Loudermilk et al. |
| 6,278,835 B1 | 8/2001 | Takiguchi |
| 6,359,649 B1 * | 3/2002 | Suzuki ................ H04N 5/225 348/220.1 |
| 6,690,415 B1 * | 2/2004 | Mamiya .................. 348/207.1 |
| 7,034,881 B1 * | 4/2006 | Hyodo ................ H04N 5/2351 348/231.6 |
| 2001/0045942 A1 * | 11/2001 | Uchiyama et al. ........... 345/173 |

\* cited by examiner

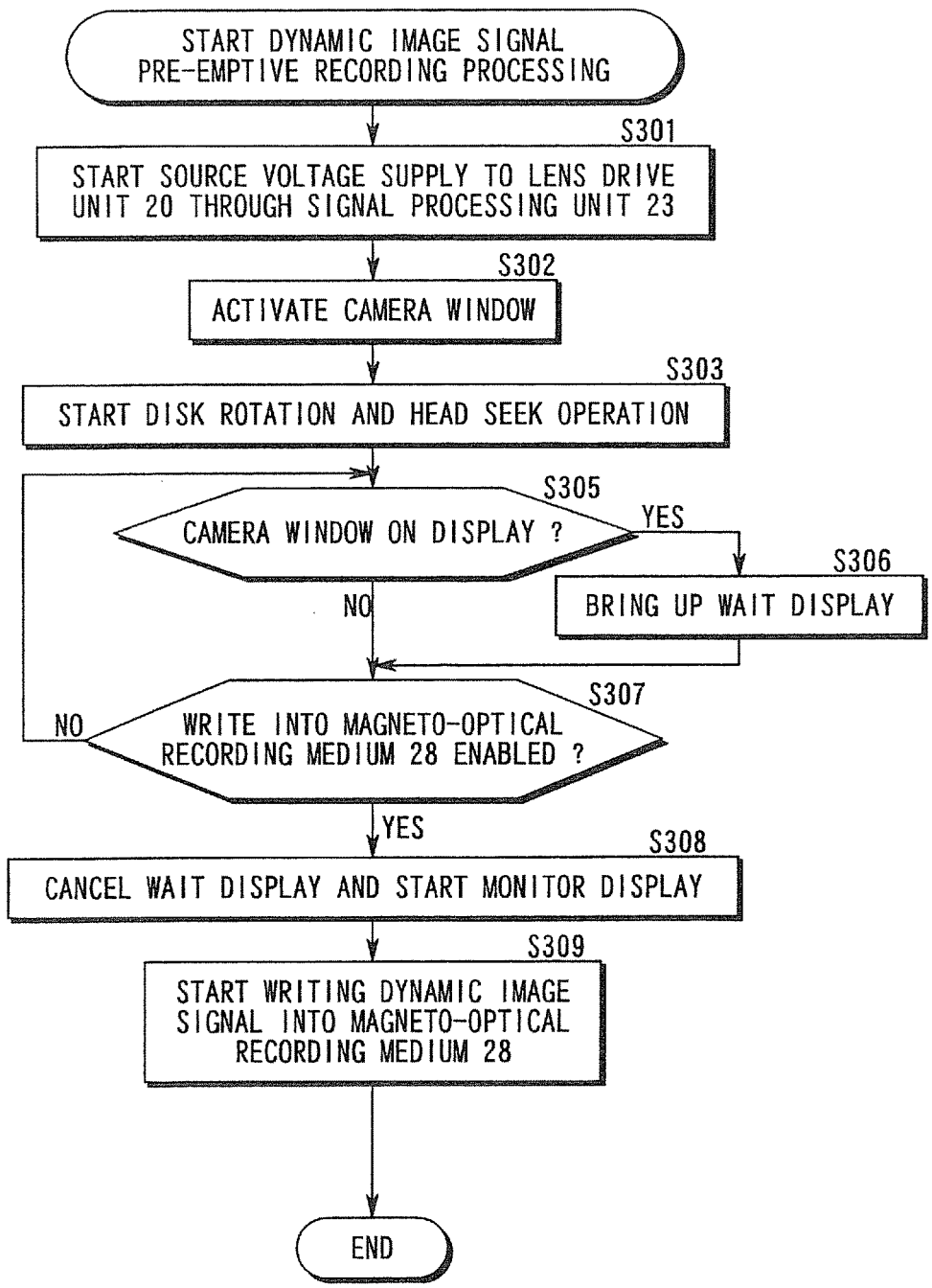

IMAGE SIGNAL RECORDING/REPRODUCTION APPARATUS, METHOD EMPLOYED THEREIN, AND IMAGE SIGNAL RECORDING APPARATUS

This is a Continuation of application Ser. No. 11/898,455 filed Sep. 12, 2007, which is a Continuation of application Ser. No. 10/364,368 filed Feb. 12, 2003, which is a Continuation of application Ser. No. 09/318,830 filed May 26, 1999. The disclosures of the prior applications are hereby incorporated by reference herein in their entirety.

INCORPORATION BY REFERENCE

The disclosures of the following priority applications are herein incorporated by reference:

Japanese Patent Application No. 10-145818 filed on May 27, 1998

Japanese Patent Application No. 10-145819 filed on May 27, 1998

BACKGROUND OF THE INVENTION

Field of the Invention

The present invention relates to an image signal recording/reproduction apparatus, a method of image signal recording/reproduction and an image signal recording apparatus.

Description of the Related Art

Examples of recording media employed to record images in movie cameras in the prior art include magnetic tape. In such a movie camera employing magnetic tape, when an instruction to start recording an image is issued, the drive of an imaging unit constituted of a CCD or the like starts and, after sequentially performing an operation to wind the magnetic tape onto a cylinder, an operation to set the cylinder in a steady-rotating state and an operation to advance the loaded magnetic tape to a position where recording is enabled (hereafter, these operations are collectively referred to as the preparatory operations), the camera enters a state in which recording on the magnetic tape is enabled.

Since it is necessary to perform a number of operations as described above before the recording-enabled state is achieved in the movie camera described above, a certain length of time elapses after, for instance, the user operates a recording start button until the actual recording of the image signal starts. Since images cannot be captured during this time, the user may miss recording an opportunity to capture a desired scene.

This problem is dealt with in movie cameras in the prior art by providing a standby state in which recording of an image signal can be started any time with the tape wound at the cylinder and the cylinder in the steady-rotating state.

However, there is a problem in that, since the motor is rotating at all times in the standby state, extra power is consumed. In addition, there is a problem of the tape or the magnetic head becoming worn since the motor is rotating while the tape is stationary.

Furthermore, when starting recording immediately after turning on the power at the main unit, for instance, a certain length of time must elapse before the recording can start, which may cause the user to miss recording the desired scene, as explained above.

Moreover, when it becomes necessary to immediately switch to a recording operation while performing a reproduction operation in the movie camera, the recording operation cannot be started promptly for the following reason. Namely, when switching from the reproduction operation to the recording operation, the operating mode at the movie camera must be switched from the reproduction operation mode to the recording operation mode by temporarily stopping the tape. When the recording operation at the movie camera is then started, the preparatory operations described earlier are performed again before the actual recording operation starts. Thus, a significant length of time must elapse before the recording start, which may cause the user to miss recording the desired scene.

SUMMARY OF THE INVENTION

An object of the present invention is to provide an image signal recording/reproduction apparatus, a method of image signal recording/reproduction and an image signal recording apparatus that allow recording of a dynamic image signal, a still image signal, an audio signal or the like to start promptly.

In order to achieve the object described above, the present invention comprises an imaging apparatus that captures an image of a subject to be taken, a generating apparatus that generates a dynamic image signal or a still image signal of the subject captured by the imaging apparatus, an operation apparatus that is operated to start recording of the dynamic image signal or the still image signal generated by the generating apparatus, a recording apparatus that records the dynamic image signal or the still image signal in a recording medium through mechanical drive, a reproduction apparatus that reproduces the dynamic image signal or the still image signal recorded in the recording medium through mechanical drive and a control apparatus that implements control whereby a dynamic image signal or a still image signal is recorded in a recording medium by the recording apparatus by sustaining the mechanical drive if the operation apparatus is operated while the dynamic image signal or the still image signal is being reproduced by the reproduction apparatus.

According to the present invention, if the operation apparatus is operated while the dynamic image signal or the still image signal is being reproduced by the reproduction apparatus, the control apparatus interrupts the reproduction operation.

According to the present invention, the recording medium may be a magneto-optical disk, and the mechanical drive mentioned above may contain the rotational drive of the magneto-optical disk.

The present invention is further provided with a temporary storage device that temporarily stores a dynamic image signal or a still image signal until recording of the dynamic image signal or the still image signal in the recording medium by the recording apparatus is enabled.

In addition, the present invention is provided with a control apparatus that updates the contents of the temporary storage device when the temporary storage device becomes full.

Furthermore, according to the present invention, if the operation apparatus is operated while a dynamic image signal or a still image signal is being reproduced by the reproduction apparatus, the control apparatus alternately implements reproduction of the dynamic image signal or the still image signal performed by the reproduction apparatus and recording of the dynamic image signal or the still image signal performed by the recording apparatus through time sharing.

Alternatively, according to the present invention, the control apparatus may simultaneously implement reproduction of the dynamic image signal or the still image signal performed by the reproduction apparatus and recording of the dynamic image signal or the still image signal performed by the recording apparatus if the operation apparatus is operated while the dynamic image signal or the still image signal is being reproduced by the reproduction apparatus.

The present invention is further provided with a stop operation apparatus that is operated to stop recording a dynamic image signal or a still image signal generated by the generating apparatus, and the control apparatus stops recording in the recording medium of a dynamic image signal or a still image signal newly generated by the generating apparatus after the stop operation apparatus has been operated in response to the operation of the stop operation apparatus and then, in succession, implements the recording of a dynamic image signal or still image signal stored at the temporary storage device in the recording medium.

Furthermore, according to the present invention, a dynamic image signal or a still image signal may be recorded so that during a reproduction operation, a dynamic image signal or a still image signal recorded in the recording medium after the stop operation apparatus has been operated is reproduced prior to reproduction of the dynamic image signal or still image signal recorded in the recording medium before the stop operation apparatus has been operated.

The present invention also provides a method of image signal recording/reproduction that is adopted in an image signal recording/reproduction apparatus comprising an imaging apparatus that captures an image of a subject to be taken, a generating apparatus that generates a dynamic image signal or a still image signal of the subject captured by the imaging apparatus, an operation apparatus that is operated to start recording of the dynamic image signal or the still image signal generated by the generating apparatus, a recording apparatus that records the dynamic image signal or the still image signal generated by the generating apparatus in a recording medium through mechanical drive and a reproduction apparatus that reproduces the dynamic image signal or the still image signal recorded in the recording medium through mechanical drive.

This method of image signal recording/reproduction includes a step in which the mechanical drive is sustained if the operation apparatus is operated while a dynamic image signal or a still image signal is being reproduced by the reproduction apparatus and a step in which the dynamic image signal or the still image signal is recorded in the recording medium by the recording apparatus.

The present invention comprises an imaging apparatus that captures an image of a subject to be taken, a generating apparatus that generates a dynamic image signal or a still image signal of the subject captured by the imaging apparatus, a display apparatus that displays information, a first instruction device provided superimposed on the display apparatus that issues an instruction to start recording of the dynamic image signal or the still image signal generated by the generating apparatus and a second instruction device provided at a position that is different from the position at which the first instruction device is installed, which issues an instruction to start recording of the dynamic image signal or the still image signal generated by the generating apparatus.

In addition, according to the present invention, a recording start may be instructed by the second instruction device regardless of whether or not a recording start can be instructed by the first instruction device.

In addition, according to the present invention, the generating apparatus is capable of generating a dynamic image signal and a still image signal, and the second instruction device is provided with a third instruction device that issues an instruction to start recording the dynamic image signal and a fourth instruction device that issues an instruction to start recording the still image signal.

Furthermore, according to the present invention, when the third instruction device issues an instruction to start recording in a state in which an instruction to start recording cannot be issued by the first instruction device, the still image signal is first recorded and then recording of the dynamic image signal is performed in succession.

Moreover, according to the present invention, the first instruction device issues an instruction to start recording either the dynamic image signal or the still image signal, and the second instruction device issues an instruction to start recording an image signal other than the image signal the recording start for which has been instructed by the first instruction device.

BRIEF DESCRIPTION OF THE DRAWINGS

FIG. 19 is a flowchart illustrating an example of dynamic image signal pre-emptive recording processing executed in the movie camera in FIG. 18.

DESCRIPTION OF THE PREFERRED EMBODIMENTS

Figure 1:
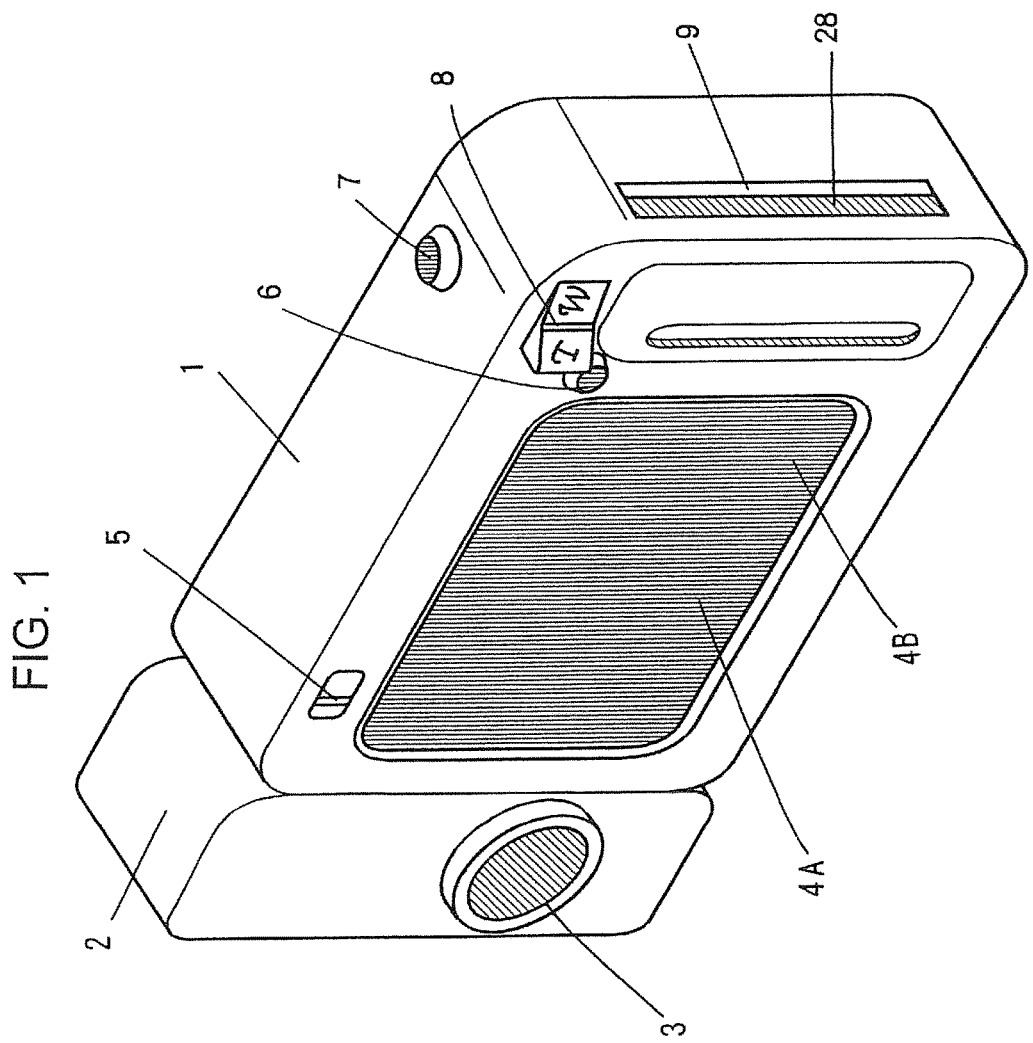
FIG. 1 is a perspective illustrating an example of the external structure of a movie camera adopting the present invention.

FIG. 1 is a perspective illustrating an example of the external structure of a movie camera adopting the present invention. At the front surface of a main unit 1, a liquid crystal display unit 4A is provided. A touch-panel 43 is provided on the screen of the liquid crystal display unit 4A. The touch-panel 4B outputs a position signal that corresponds to a position specified through a user touch operation. The touch-panel 4B is constituted of a transparent material such as glass or resin. The user can view through the touch-panel 4B an image displayed on the liquid crystal display unit 4A which is provided under the touch-panel 4B.

In addition, at the front surface of the main unit 1, a power switch (main switch) 5, a dynamic image recording button 6 which is operated to start dynamic image recording and a zoom button 8 which is operated to change the focal length for the taking lens are provided. At the upper surface of the main unit 1, a still image recording button 7 which is operated to start still image recording is provided. A slot 9 is provided at a side surface (the right side surface in FIG. 1) of the main unit 1. A detachable magneto-optical recording medium 28 or the like, such as an MO (magneto-optical) disk, is loaded at the slot 9.

In addition, a camera unit 2 is rotatably mounted at the main unit 1. The camera unit 2 is capable of performing photographing at any angle position over the 360° range. Thus, the user can perform photographing at various camera angles while monitoring the subject displayed on the liquid crystal display unit 4A.

Figure 2:
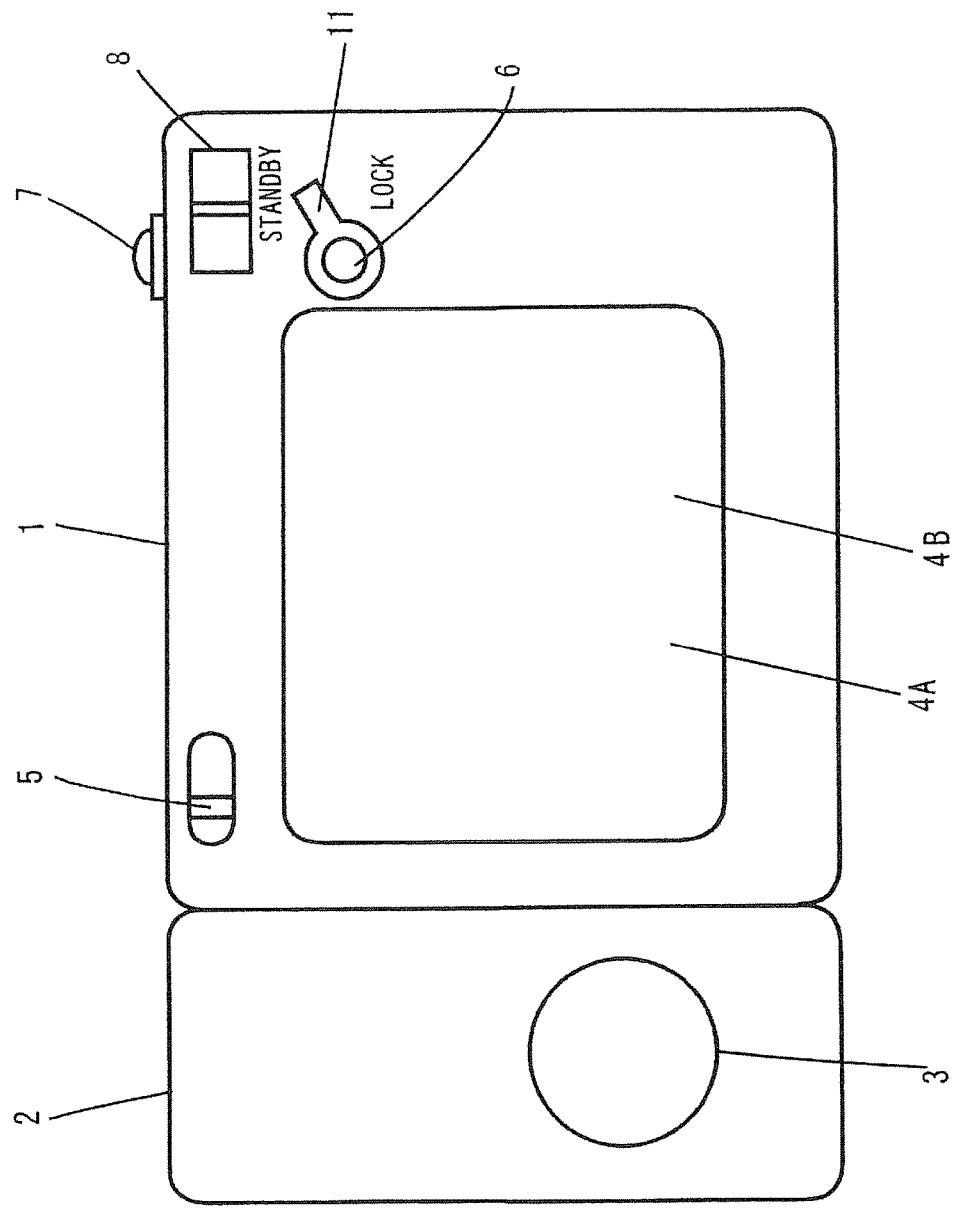
FIG. 2 illustrates a structural example in which a selector switch 11 is provided at the main unit 1 in FIG. 1.

It is to be noted that a selector switch 11 that achieves selection between a state in which the dynamic image recording button 6 can be operated and a state in which it cannot be operated may be provided at the main unit 1, as illustrated in FIG. 2. In the example, when the lever at the selector switch 11 is switched to the "standby" position, operation of the dynamic image recording button 6 is enabled (i.e., the operation is accepted). In addition, when the lever is switched to the "lock" position, operation of the dynamic image recording button 6 is disabled (not accepted). This prevents the photographer from inadvertently operating the dynamic image recording button 6.

Figure 3:
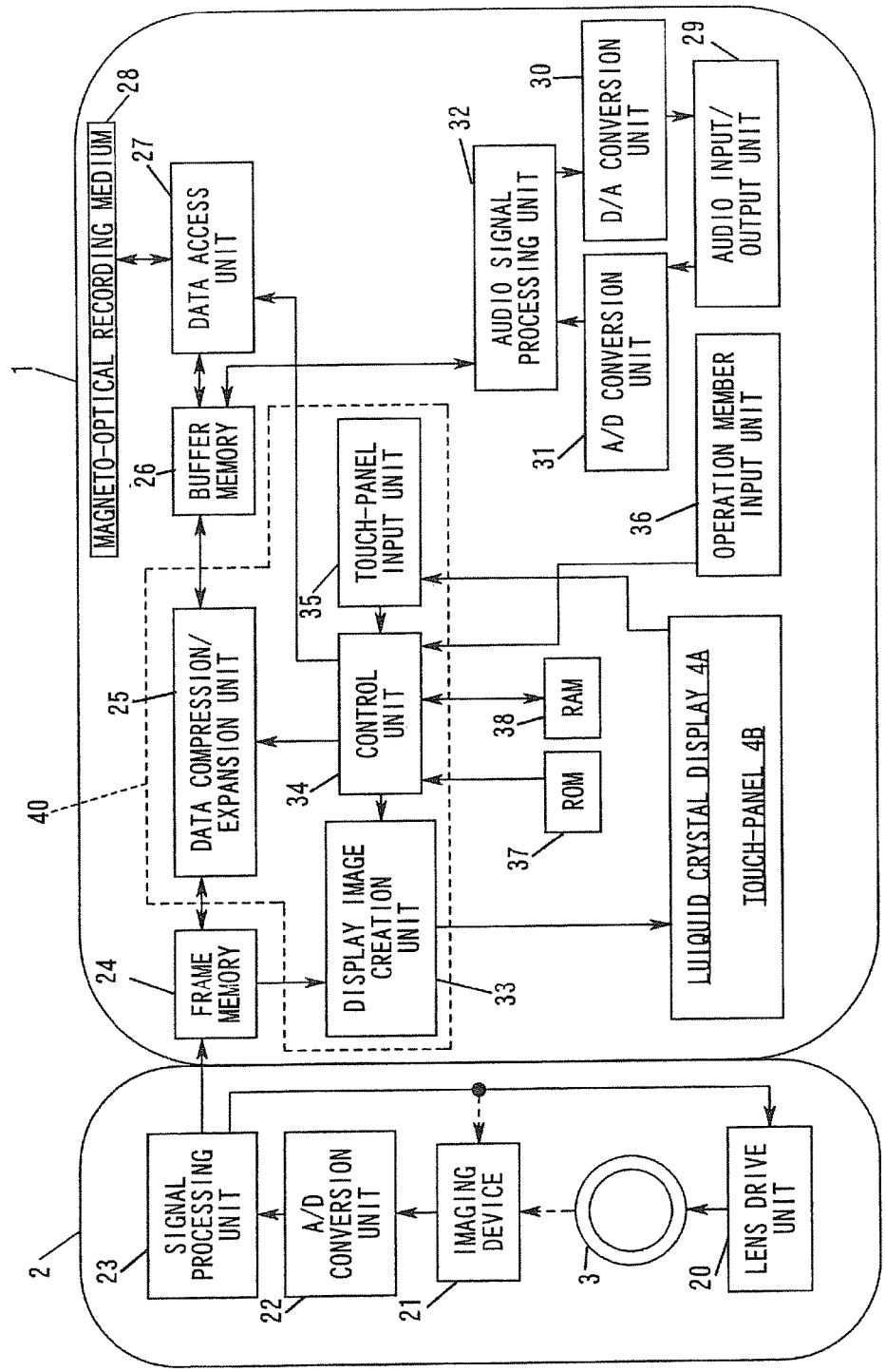
FIG. 3 is a block diagram illustrating an example of the electrical structure of the movie camera in FIG. 1.

FIG. 3 is a block diagram illustrating an example of an electrical structure of the movie camera in FIG. 1. A lens drive unit 20 which is controlled by a signal processing unit 23 drives a taking lens 3 to achieve focus adjustment, zoom adjustment and the like. An imaging device 21 performs photoelectric conversion of a subject image which is formed via the taking lens 3 and outputs an image signal (electrical signal) to an A/D conversion unit 22. The A/D conversion unit 22 converts the analog image signal provided by the imaging device 21 to a digital image signal. The signal processing unit 23 implements control of exposure at the imaging device 21 (including control of the aperture at the taking lens 3 and control of the gain used to amplify the image signal output by the imaging device 21. In addition, the signal processing unit 23 performs processing such as white balance correction and gamma control on an image signal provided by the A/D conversion unit 22 and outputs the processed signal to a frame memory 24.

The frame memory 24 stores an image signal provided by the signal processing unit 23 or a data compression/expansion unit 25 in units of a predetermined number of individual frames. The data compression/expansion unit 25 compresses an image signal (a dynamic image signal or a still image signal) read out from the frame memory 24 and outputs the compressed data to a buffer memory 26. In addition, the data compression/expansion unit 25 expands an image signal read out from the buffer memory 26 for output to the frame memory 24.

A data access unit 27 is provided with a recording/reproduction head. The data access unit 27 drives the loaded magneto-optical recording medium 28 to record an image signal or an audio signal read out from the buffer memory 26 in the magneto-optical recording medium 28. The data access unit 27 also reads out an image signal or an audio signal recorded in the magneto-optical recording medium 28 and outputs it to the buffer memory 26.

An audio input/output unit 29, which is provided with a microphone and a speaker (not shown), outputs sound that has been input through the microphone as an audio signal to an A/D conversion unit 31. In addition, the audio input/output unit 29 outputs an audio signal provided by a D/A conversion unit 30 via the speaker as sound. The D/A conversion unit 30 converts a digital audio signal provided by an audio signal processing unit 32 to a an analog audio signal and outputs it to the audio input/output unit 29. The A/D conversion unit 31 converts an analog audio signal provided by the audio input/output unit 29 to a digital audio signal and outputs it to the audio signal processing unit 32. The audio signal processing unit 32 compresses an audio signal provided by the A/D conversion unit 31 and outputs it to the buffer memory 26. In addition, the audio signal processing unit 32 expands the audio signal read out from the buffer memory 26 to output it to the D/A conversion unit 30.

A display image creation unit 33 creates an image that corresponds to the image signal read out from the frame memory 24 and displays the image on the liquid crystal display unit 4A. A touch-panel input unit 35 outputs an operation signal (position signal) from the touch-panel 4B to a control unit 34. An operation member input unit 36 receives an operation signal from an operation member such as the power switch 5, the dynamic image recording button 6, the still image recording button 7 and the zoom button 8 and outputs the received signal to the control unit 34. The control unit 34 implements control of the various units in conformance to a program stored in a ROM 37. The control unit 34, which is internally provided with a timer (not shown), is also engaged in a time counting operation at all times. Data and programs required by the control unit 34 to execute various types of processing are stored at a RAM 38.

It is to be noted that the data compression/expansion unit 25, the display image creation unit 33, the touch-panel input unit 35 and the control unit 34 may be realized as internal functions of a microprocessor 40.

Figure 4:
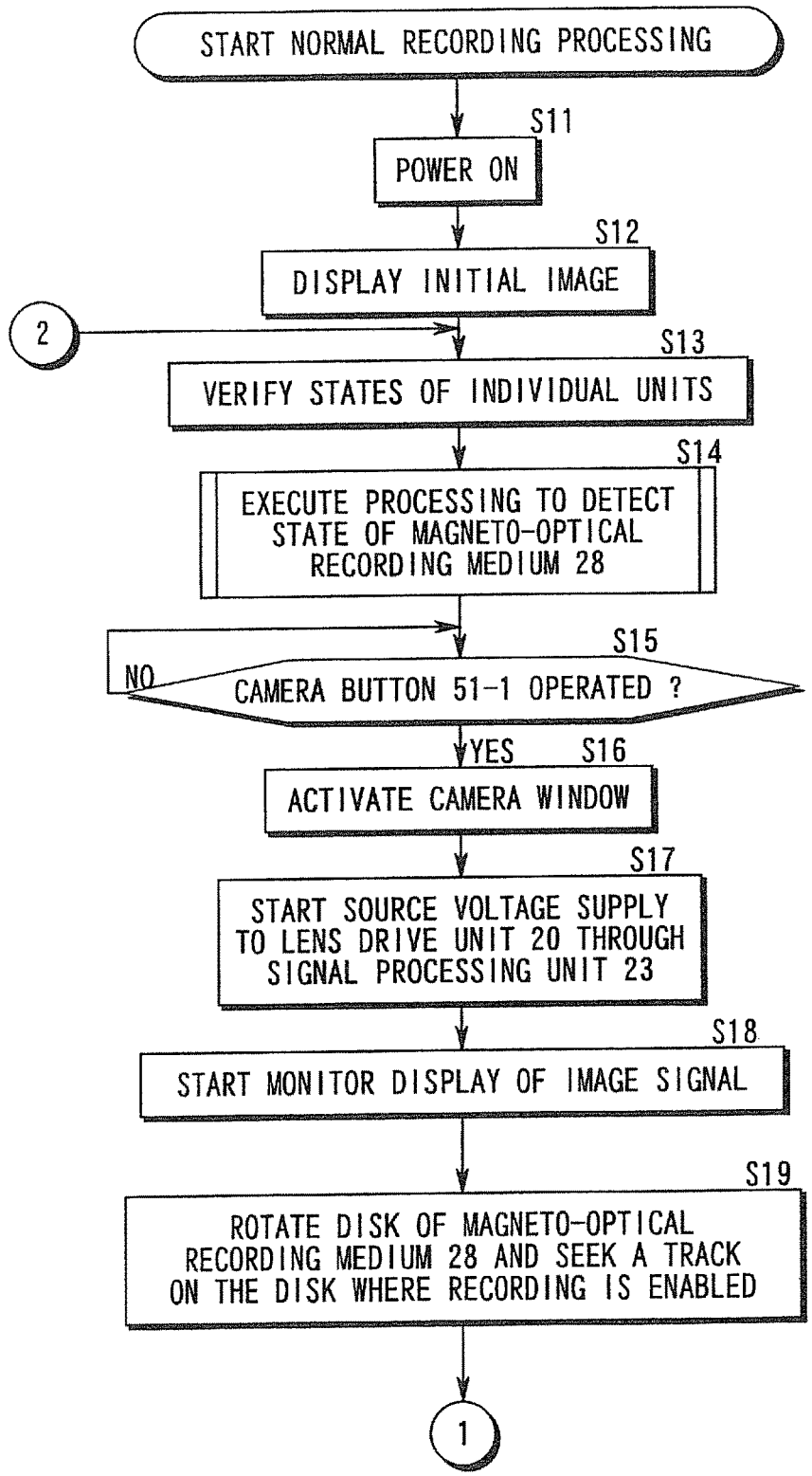
FIG. 4 is a flowchart illustrating the operation in which normal recording processing is performed.
Figure 5:
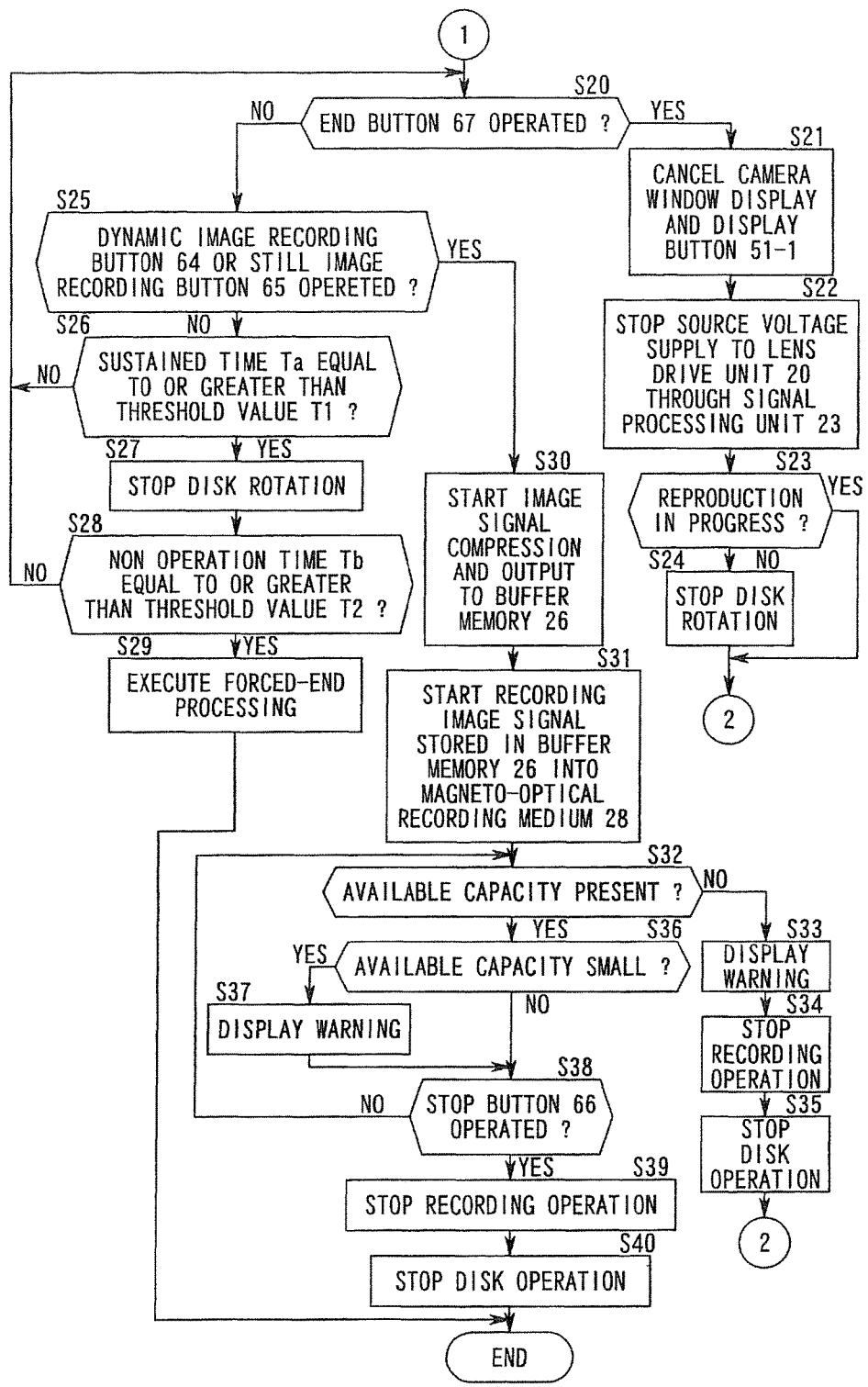
FIG. 5 is a flowchart continuing from FIG. 4.
Figure 6:
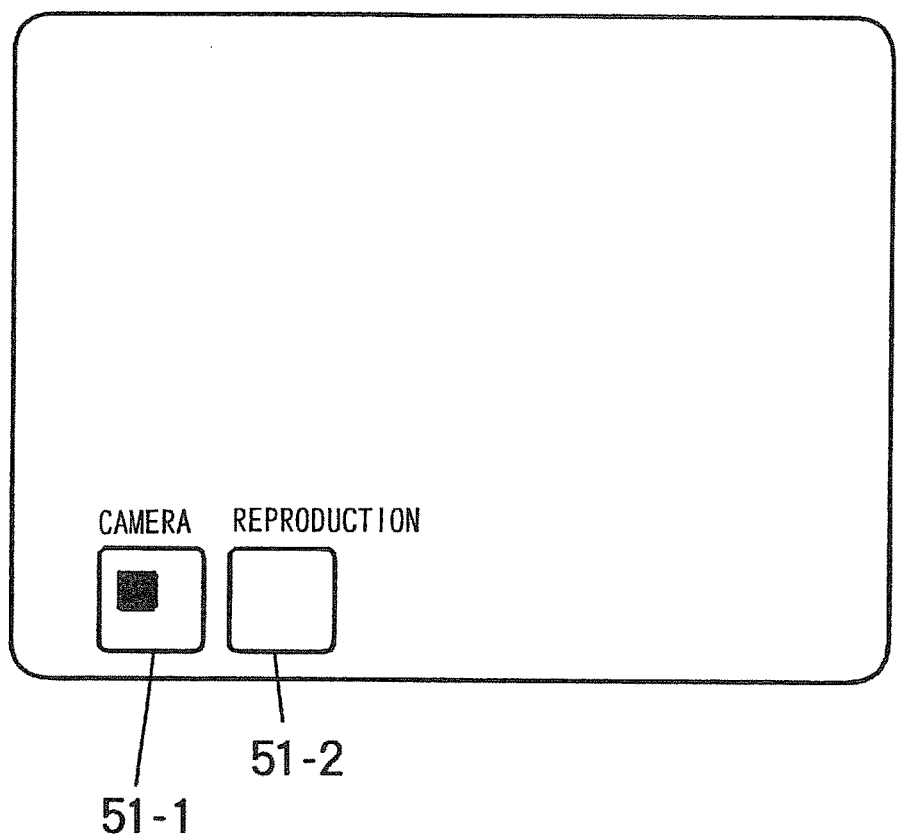
FIG. 6 illustrates an example of the initial image display.

Next, in reference to the flowchart presented in FIGS. 4 and 5, the normal recording processing is explained. In step S11, the user operates the power switch 5 to turn on the power at the main unit 1. Next, in step S12, the control unit 34 implements control of the display image creation unit 33 to display an initial image on the liquid crystal display unit 4A. FIG. 6 presents a display example of the initial image. In the example in FIG. 6, a camera button 51-1 and a disk button (reproduction button) 51-2 are displayed in the lower left corner of the screen. When the user touches the area where either the camera button 51-1 or the disk button 51-2 is displayed with a finger or the like, an operation signal is output to the touch-panel input unit 35 from the touch-panel 4B. In the following explanation, touching the area where, for instance, the camera button 51-1 is displayed with a finger or the like is referred to as "operating the camera button 51-1."

When the user operates the camera button 51-1, display of the camera window (the camera window will be explained later in reference to FIG. 7) that is utilized for recording a dynamic image or a still image starts. When the display of the camera window ends, the button 51-1 is displayed. When the camera button 51-1 is on display, the lens drive unit 20~the signal processing unit 23 in FIG. 3 are all in a state in which their operations are halted. This prevents wasteful consumption of power. Likewise, when the disk button 51-2 is operated, display of the disk window which is used to verify (reproduce) the contents recorded in the magneto-optical recording medium 28 starts. When the display of the disk window ends, the disk button 51-2 is displayed.

The operation then proceeds to step S13 in which the control unit 34 verifies the states of the respective units and, in step S14, the detection processing, in which the state of the magneto-optical recording medium 28 is detected (to be detailed later in reference to FIG. 8), is executed. Then, in step S15, a decision is made as to whether or not the camera button 51-1 (see FIG. 6) has been operated, and if it is decided that the camera button 51-1 has not been operated, the operation returns to step S15. If it is decided in step S15 that the camera button 51-1 has been operated, the operation proceeds to step S16 in which the control unit 34 starts display of the camera window.

Figure 7A:
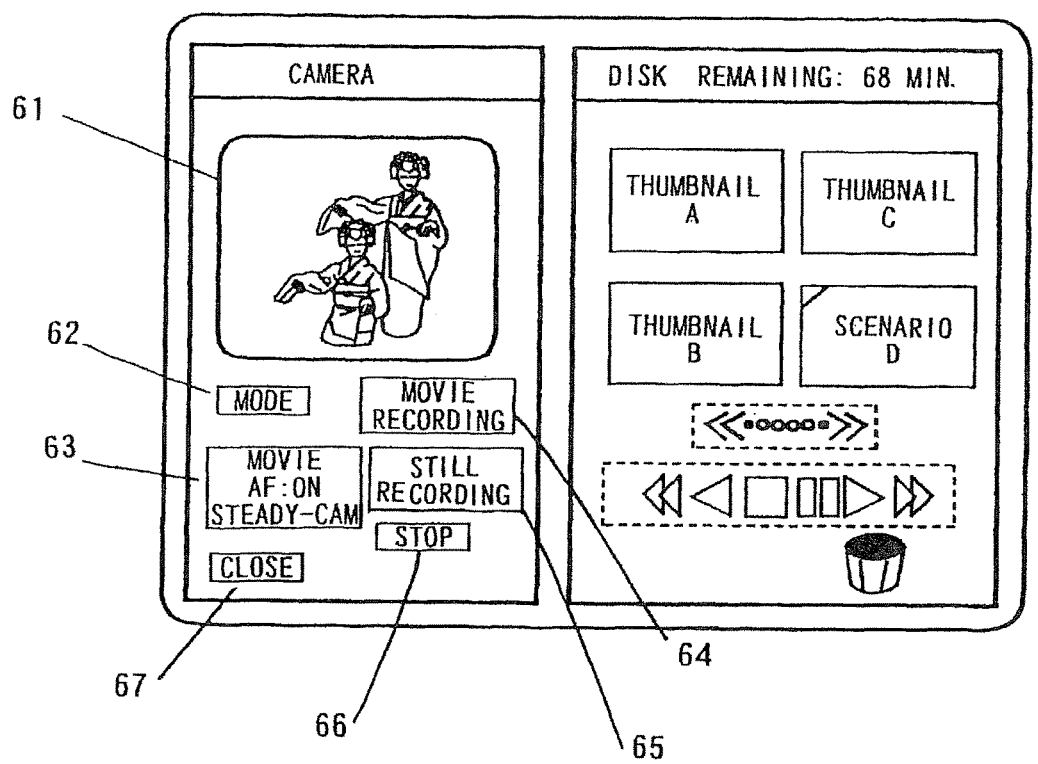
FIG. 7 illustrates an example of the camera window display.
Figure 7B:
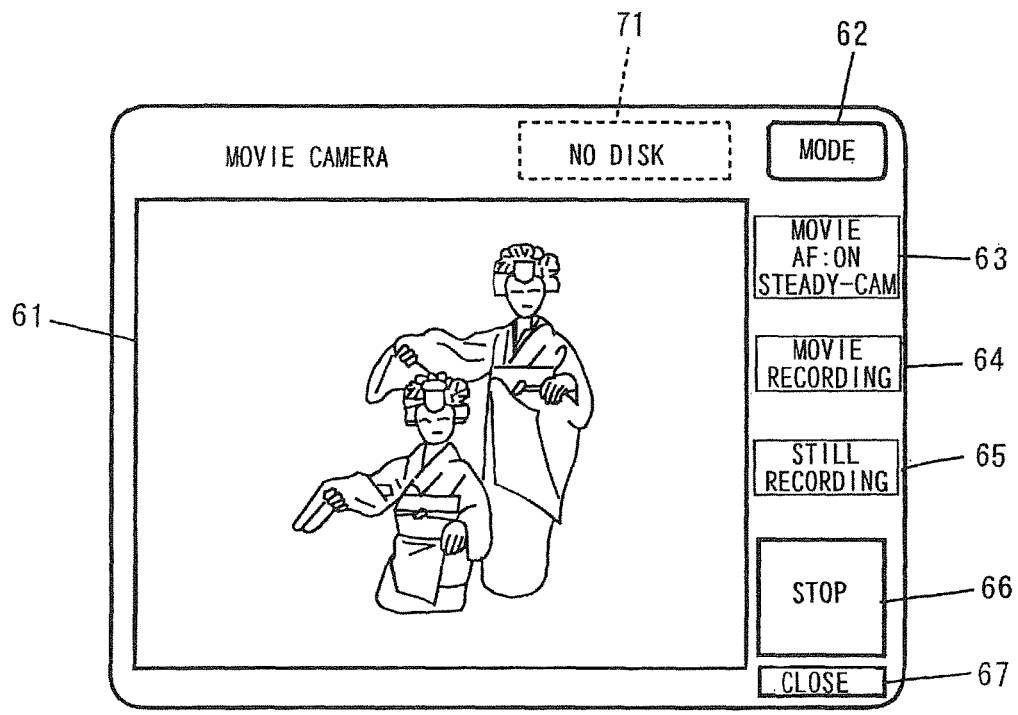

FIGS. 7A and 7B present display examples of the camera window. FIG. 7A shows an example in which the camera window is displayed together with the disk window which is to be detailed later in reference to FIG. 9. In the example in FIG. 7A, an image that has been taken in (or an image being recorded) is displayed in an area 61. A mode button 62 is operated to select a mode such as an autofocus mode, a steady-cam mode or the like. The selected mode is displayed in an area 63. A dynamic image recording button (movie recording button) 64 is operated to start dynamic image recording. A still image recording button (still recording button) 65 is operated to start still image recording. A stop button 66 is operated to stop the recording operation in progress. An end button (close button) 67 is operated to end (close) the camera window display. FIG. 7B presents an example in which the camera window is displayed over the entire screen. In FIG. 7B, the same reference numbers are assigned to areas identical to those in FIG. 7A and their explanation is omitted. In the example in FIG. 7B, the available recording time (the available capacity in the magneto-optical recording medium 28) or the like is displayed in an area 71.

Next, the operation proceeds to step S17 in which the control unit 34 starts operations of the lens drive unit 20~the signal processing unit 23 (in other words, power supply to the lens drive unit 20~the signal processing unit 23 is started). With this, image signals corresponding to the subject image formed on the imaging device 21 by the taking lens 3 are sequentially stored in the frame memory 24. Then, the operation proceeds to step S18 in which the control unit 34 implements control of the display image creation unit 33 to start monitor display of the image signal sequentially stored in the frame memory 24 on the liquid crystal display unit 4A. In step S19, the control unit 34 issues an instruction to the data access unit 27 to start rotation of the disk (the magneto-optical recording medium 28) and to make a seek operation to position the head at a track on the disk where recording is enabled. Thus, a state in which recording can be started any time (standby state) is set.

In step S20, a decision is made as to whether or not the end button 67 has been operated. If it is decided that the end button 67 has been operated, the operation proceeds to step S21 in which the control unit 34 implements control of the display image creation unit 33 to erase the camera window display and display the button 51-1. In step S22, the control unit 34 stops the power supply to the lens drive unit 20~the signal processing unit 23. This causes the operations of the lens drive unit 20~the signal processing unit 23 to stop. If a recording operation is performed concurrently during a reproduction operation as in the embodiment illustrated in FIG. 16, which is to be explained later, a decision is made in FIG. 23 as to whether or not reproduction is in progress. If it is decided in step S23 that a reproduction operation is in progress, the operation returns to step S13 in which the control unit 34 executes subsequent processing. If it is decided in step S23 that reproduction is not in progress, the operation proceeds to step S24 in which the data access unit 27 stops the disk rotation. Then, the operation returns to step S13 to execute the processing in step S13 and subsequent steps.

If it is decided in step S20 that the end button 67 has not been operated, the operation proceeds to step S25. In step S25, a decision is made as to whether or not the dynamic image recording button 64 or the still image recording button 65 has been operated. If it is decided that neither the dynamic image recording button 64 nor the still image recording button 65 has been operated, the operation proceeds to step S26. In step S26, the control unit 34 makes a decision as to whether or not the length of time Ta over which the disk rotation has been sustained is equal to or greater than a threshold value T1, and if it is decided that the length of time Ta that rotation has been sustained is still not equal to or greater than the threshold value T1, the operation returns to step S20 to execute the processing in step S20 and subsequent steps. If it is decided in step S26 that the length of time Ta over which the disk rotation has been sustained is equal to or greater than the threshold value T1, the operation proceeds to step S27. In step S27, the control unit 34 issues a command signal to the data access unit 27 to stop the disk rotation, and then the operation proceeds to step S28. In step S28, a decision is made as to whether or not the length of time Tb of non-operation (the length of time over which no operation has been performed by the user) is equal to or greater than a threshold value T2. If it is decided that the length of non-operation time Tb is not yet equal to or greater than the threshold value T2, the operation returns to step S20 in which the control unit 34 executes the processing in step S20 and subsequent steps. If it is decided in step S28 that the length of non-operation time Tb is equal to or greater than the threshold value T2, the operation proceeds to step S29 in which the control unit 34 executes forced-end processing (this point will be detailed later in reference to FIG. 10).

If it is decided in step S25 that either the dynamic image recording button 64 or the still image recording button 65 has been operated, the operation proceeds to execute the operation in step S30. In step S30, the control unit 34 issues a command to the data compression/expansion unit 25 to compress the image signal stored in the frame memory 24 and output it to the buffer memory 26, In step S31, the control unit 34 issues a command signal to the data access unit 27 to read out the image signal stored in the buffer memory 26 and record it in the magneto-optical recording medium 28.

In step S32, a decision is made as to whether or not there is any available capacity in the magneto-optical recording medium 28. If it is decided that there is no available capacity, the operation proceeds to step S33 in which the control unit 24 implements control of the display image creation unit 33 to display a warning such as "no available capacity" on the liquid crystal display unit 4A. Then, the control unit 34 stops the recording operation (the compression of the image signal and storage of the compressed image signal in the buffer memory 26, performed by the data compression/expansion unit 25) in step S34. In step S35, the control unit 34 issues a command to the data access unit 27 to stop the disk rotation. After this, the operation returns to step S13 in which the control unit 34 executes the processing in step S13 and subsequent steps.

If it is decided in step S32 that there is available capacity in the magneto-optical recording medium, the operation proceeds to step S36. In step S36, the control unit 34 makes a decision as to whether or not the available capacity in the magneto-optical recording medium 28 is small. If it is decided in step S36 that the available capacity is small, the operation proceeds to step S37, in which the control unit 34 implements control of the display image creation unit 33 to display a warning such as "running out of available capacity" on the liquid crystal display unit 4A before proceeding to step S38. If it is decided in step S36 that there is still sufficient available capacity, the operation proceeds to step S38, in which the control unit 34 makes a decision as to whether or not the stop button 66 has been operated. If the control unit 34 decides in step S38 that the stop button 66 has not been operated, the operation returns to step S32, in which the control unit 34 executes the processing in step S32 and subsequent steps. If it is decided in step S38 that the stop button 66 has been operated, the operation proceeds to step S39, in which the control unit 34 stops the recording operation. In step S40, the data access unit 27 stops the rotation of the disk constituting the magneto-optical recording medium 28.

Figure 8:
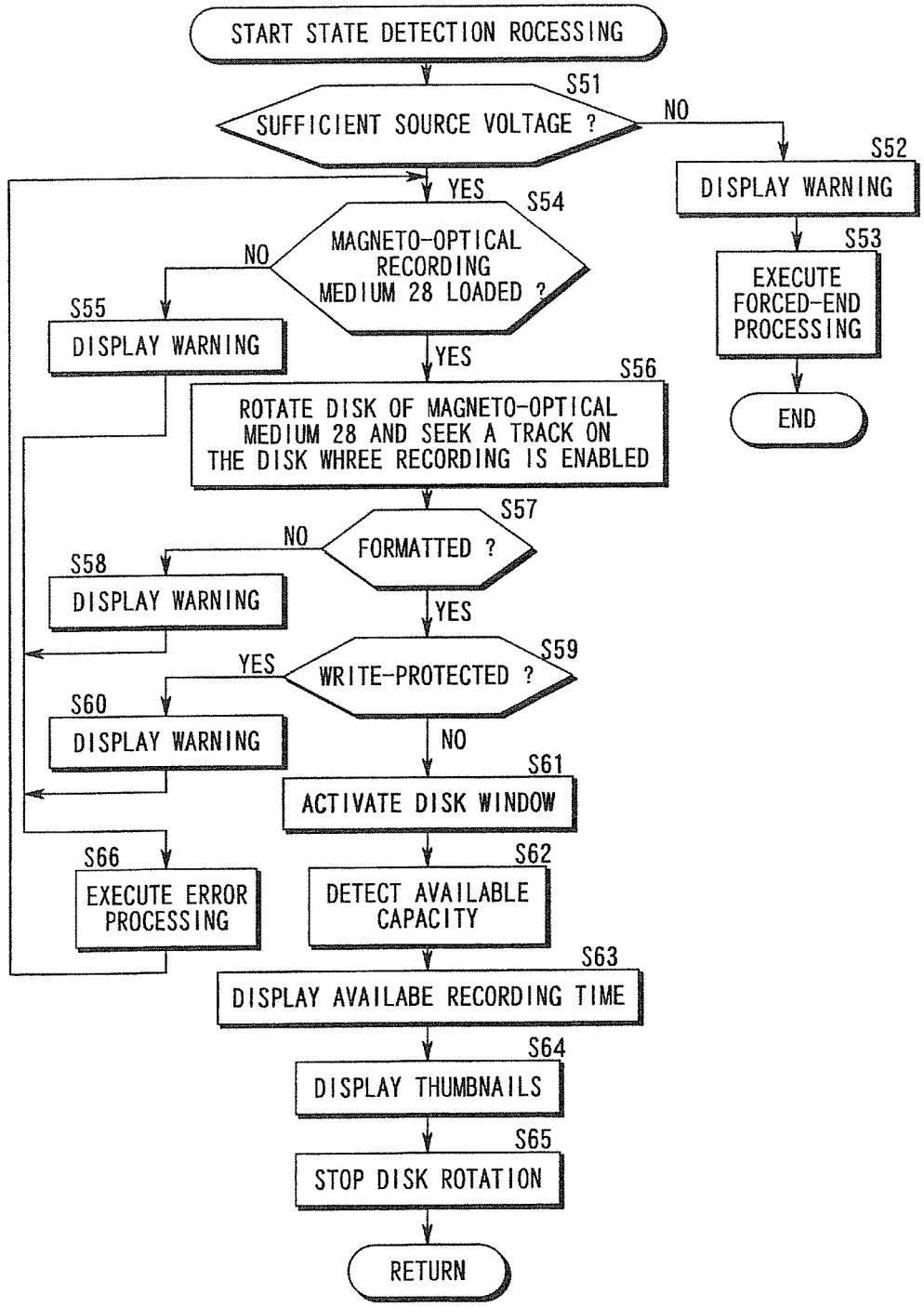
FIG. 8 is a flowchart illustrating detection processing in which the state of the magneto-optical recording medium 28 is detected.

FIG. 8 is a flowchart that illustrates the processing through which the state of the magneto-optical recording medium 28 is detected. First, in step S51, the control unit 34 makes a decision as to whether or not there is sufficient source voltage (i.e., whether or not there is sufficient battery power remaining). If it is decided that there is not sufficient source voltage (there is not sufficient battery power remaining), the operation proceeds to step S52 to implement control of the display image creation unit 33 to display a warning such as "battery low." The control unit 34 executes forced-end processing in step S53. If it is decided in step S51 that the source voltage is sufficiently high (there is sufficient battery power remaining), the operation proceeds to step S54 to input information from the data access unit 27 and make a decision as to whether or not the magneto-optical recording medium 28 is loaded. If it is decided in step S54 that the magneto-optical recording medium 28 is not loaded, the operation proceeds to step S55. In step S55, the control unit 34 implements control of the display image creation unit 33 to display a warning such as "no disk loaded," and then the operation proceeds to step S66. In step S66, the control unit 34 executes error recovery processing by, for instance prompting the user to load the magneto-optical recording medium 28 before returning to step S54.

If it is decided in step S54 that the magneto-optical recording medium 28 is loaded, the operation proceeds to step S56, in which the control unit 34 issues a command signal to the data access unit 27 to rotate the disk and initiate a seek operation to position the head at a track on the disk where recording is enabled. In step S57, a decision is made as to whether or not the magneto-optical recording medium 28 has been formatted. If it is decided in step S57 that the magneto-optical recording medium 28 has not been formatted, the operation proceeds to step S58. In step S58, the control unit 34 implements control of the display image creation unit 33 to display a warning such as "not formatted" before proceeding to step S66. In step S66, the control unit 34 executes error recovery processing by, for instance, formatting the magneto-optical recording medium 28, before returning to step S54.

If it is decided in step S57 that the magneto-optical recording medium 28 has been formatted, the operation proceeds to step S59 to make a decision as to whether or not the magneto-optical recording medium 28 is write-protected (data write is prohibited). If it is decided in step S59 that the magneto-optical recording medium 28 is write-protected (data write is prohibited), the operation proceeds to step S60. In step S60, the control unit 34 implements control of the display image creation unit 33 to display a warning such as "write prohibited" before proceeding to step S66. In step S66, the control unit 34 executes error recovery processing by, for instance, prompting the user to cancel the write-protect before returning to step S54.

Figure 9:
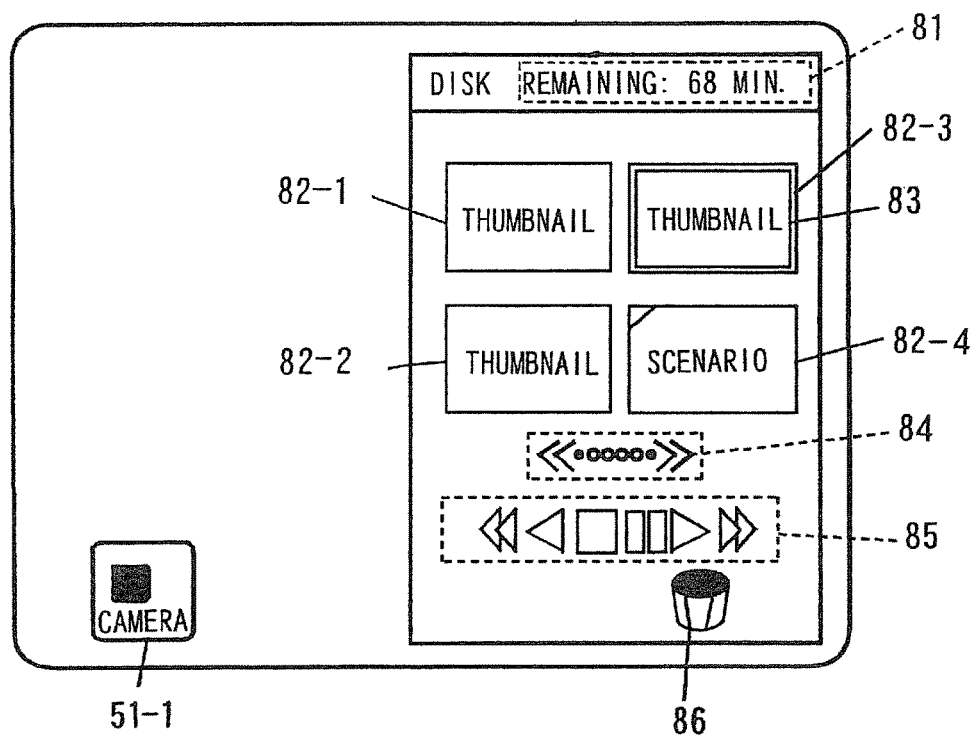
FIG. 9 illustrates an example of the disk window display.

If it is decided in step S59 that the magneto-optical recording medium 28 is not write-protected, the operation proceeds to step S61 to start disk window display. With this, the disk window is displayed on the liquid crystal display unit 4A. FIG. 9 presents a disk window display example. In this example, the available recording time is displayed in an area 81. In areas 82-1~82-4, a thumbnail of a dynamic image recorded in the magneto-optical recording medium 28, a thumbnail of a still image recorded in the magneto-optical recording medium 28 or a scenario editing image or scenario editing data in regard to these images are displayed. It is to be noted that "scenario" in this context refers to a file that provides procedures through which specific types of processing or editing are implemented on a specific portion of an image and through which a plurality of images are linked. By utilizing the scenario, it becomes possible to perform editing processing by calling up a target image and to reproduce an image obtained through editing. A cursor 83 is displayed at the selected item among the thumbnails and the scenario in the respective areas. In the example in FIG. 9, the thumbnail in the area 82-3 is selected. A scroll button 84 is operated to scroll the display in the areas 82-1~82-4 (to switch to the display of another thumbnail or of the scenario). An operating button 85 is operated to issue a command for the execution of processing such as reproduction, reverse reproduction, fast forward, fast rewind, pause, stop or the like, on the image corresponding to the selected thumbnail. A delete button 86 is operated to delete the selected thumbnail or the selected scenario.

Then, the operation proceeds to step S62 in which the control unit 34 detects the available capacity in the magneto-optical recording medium 28. In step S63, the control unit 34 implements control of the display image creation unit 33 to display the available recording time corresponding to the detected available capacity in the area 81 of the disk window. Then, in step S64, the control unit 34 causes the thumbnail or the scenario corresponding to the dynamic image signal or the still image signal recorded in the magneto-optical recording medium 28 to be displayed in the area 82-1~82-4 of the disk window. In step S65, the control unit 34 issues a command to the data access unit 27 to stop the disk rotation.

Figure 10:
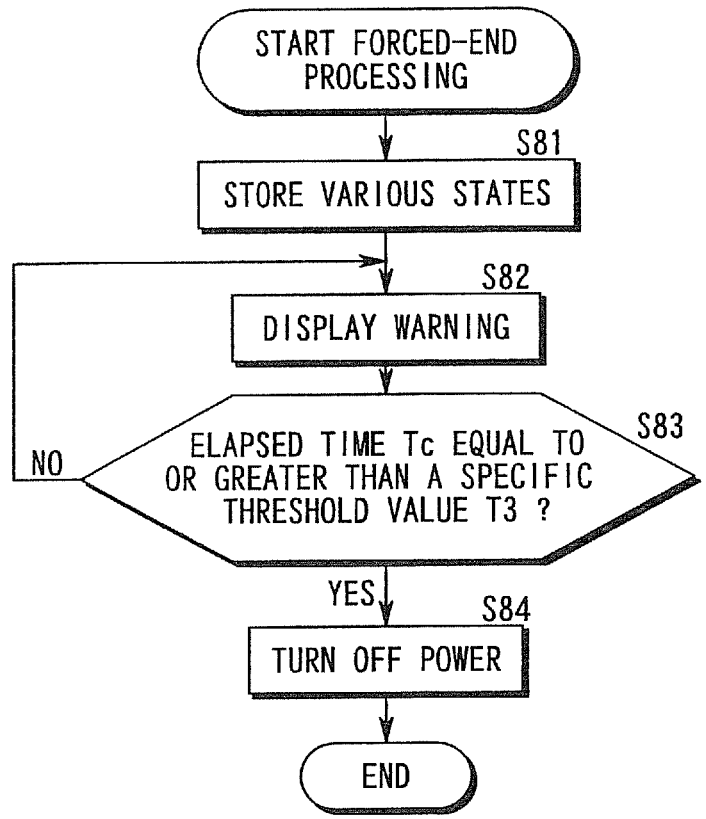
FIG. 10 is a flowchart illustrating an example of forced-end processing.

FIG. 10 is a flowchart illustrating the forced-end processing. First, in step S81, the control unit 34 stores various states (e.g., the mode setting) in, for instance, a RAM (not shown). Then the operation proceeds to step S82, in which the control unit 34 implements control of the display image creation unit 33 to display a warning such as "turning off power." In step S83, the control unit 34 makes a decision as to whether or not the length of time Tc over which the warning display has been on is equal to or greater than a threshold value T3, and if it is decided that the length of time Tc over which the display has been on is still not equal to or greater than the threshold value T3, the operation returns to step S82. If the control unit 34 decides in step S83 that the length of time Tc over which the display has been on is equal to or greater than the threshold value T3, the operation proceeds to step S84 to turn off the power at the main unit 1.

Figure 11:
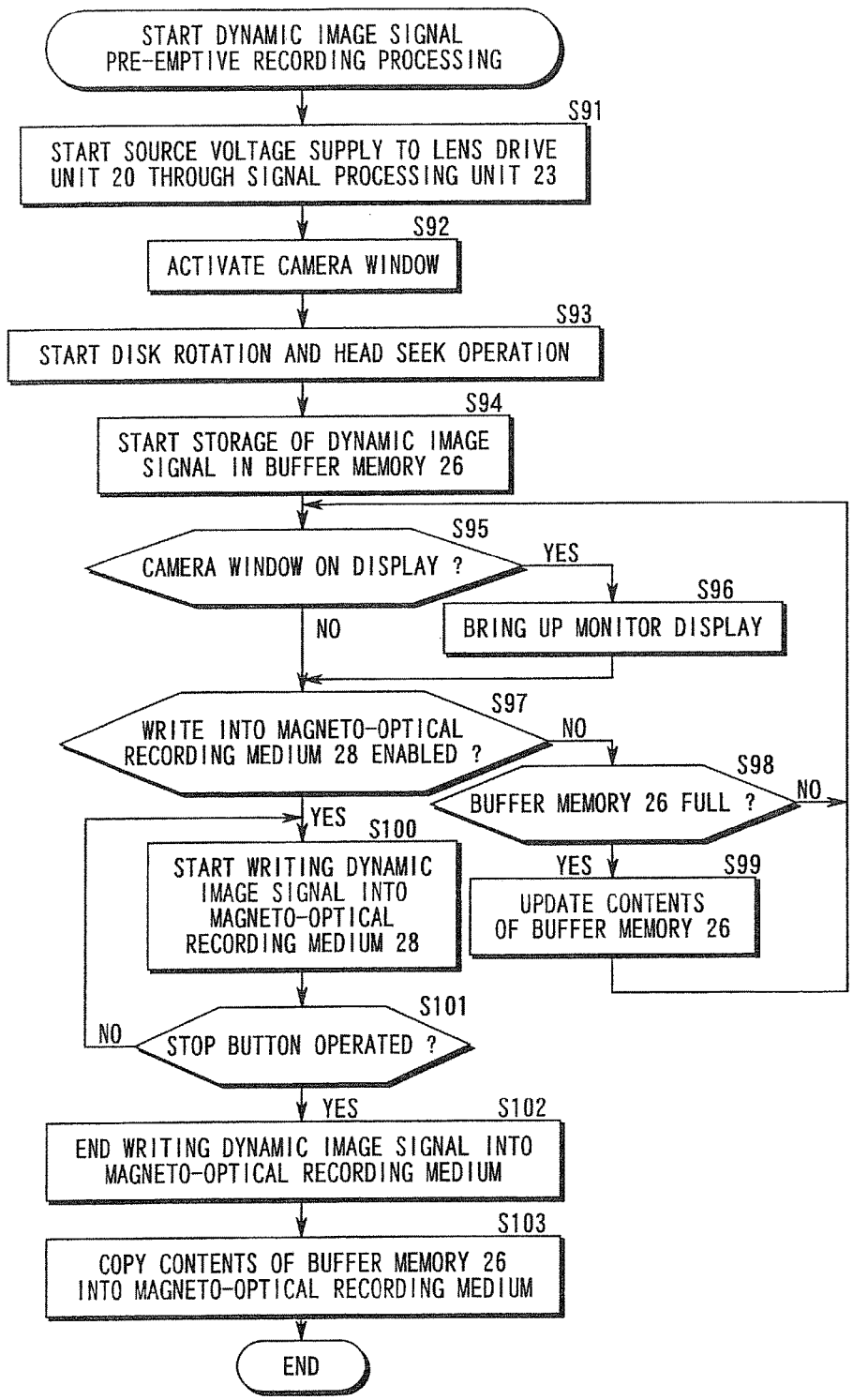
FIG. 11 is a flowchart illustrating an example of first dynamic image signal pre-emptive (or quick start) recording processing that is executed if the dynamic image recording button 6 is operated when the disk window is not active.

Next, in reference to the flowchart in FIG. 11, an example of the first dynamic image signal pre-emptive (or quick start) recording processing, which is executed if the dynamic image recording button 6 is operated while the camera window is not on display, is explained. First, in step S91, the control unit 34 starts power supply to the lens drive unit 20~the signal processing unit 23. With this, the operations at the lens drive unit 20~the signal processing unit 23 are started, and image signal are sequentially stored in the frame memory 24. In step S92, the control unit 34 starts camera window display. In step S93, the control unit 34 issues a command to the data access unit 27 to rotate the disk and initiate a seek operation to position the head at a track on the disk where recording is enabled. In step S94, the control unit 34 issues a command to the data compression/expansion unit 25 to compress dynamic image signals that are sequentially stored in the frame memory 24 and to store them in the buffer memory 26.

In step S95, a decision is made as to whether or not the camera window is on display. If the control unit 34 decides that the camera window is on display, the operation proceeds to step S96. In step S96, the control unit 34 implements control of the display image creation unit 33 to perform monitor display of the dynamic image signal in the area 61 of the camera window before proceeding to step S97. If it is decided in step S95 that the camera window is not on display, the operation proceeds to step S97. In step S97, the control unit 34 makes a decision as to whether or not a write (recording) of the dynamic image signal in the magneto-optical recording medium 28 has been enabled. If the control unit 34 decides that the dynamic image signal cannot yet be written in the magneto-optical recording medium 28 (the disk constituting the magneto-optical recording medium 28 has not reached the steady-rotating state yet, or the head has not moved to a recording-enabled position), the operation proceeds to step S98. In step S98, the control unit 34 makes a decision as to whether or not the buffer memory 26 has become full, and if it is decided that the buffer memory 26 has not become full yet, the operation returns to step S95 to execute the processing in step S95 and subsequent steps.

If it is decided in step S98 that the buffer memory 26 has become full, the operation proceeds to step S99 to update the contents of the buffer memory 26 (overwrites the dynamic image signal stored in the buffer memory 26 with a new dynamic image signal provided by the data compression/expansion unit 25) before returning to step S95 to execute the processing in step S95 and subsequent steps.

If it is decided in step S97 that a write of the dynamic image signal in the magneto-optical recording medium 28 is enabled, the operation proceeds to step S100. In step S100, the control unit 34 issues a command to the data access unit 27 to start a write of the dynamic image signal to the magneto-optical recording medium 28.

Then the operation proceeds to step S101, in which the control unit 34 makes a decision as to whether or not the stop button 66 has been operated. If it is decided that the stop button 66 has been operated, the operation proceeds to step S102, whereas if it is decided that the stop button 66 has not been operated, the operation returns to step S100.

In step S102, write-end processing to end the write of the new dynamic image signal provided by the data compression/expansion unit 25 in the magneto-optical recording medium 28 starts. Next, in step S103, the dynamic image signal stored in the buffer memory 26 is copied and recorded in the magneto-optical recording medium 28. At this point, the dynamic image signal copied from the buffer memory 26 in the magneto-optical recording medium 28 is appended to the dynamic image signal recorded in step S100 so that they will be reproduced prior to the reproduction of the dynamic image signal recorded in step S100. By implementing such appending processing, the reproduced dynamic image signal can be viewed with a sense of continuity.

Figure 12:
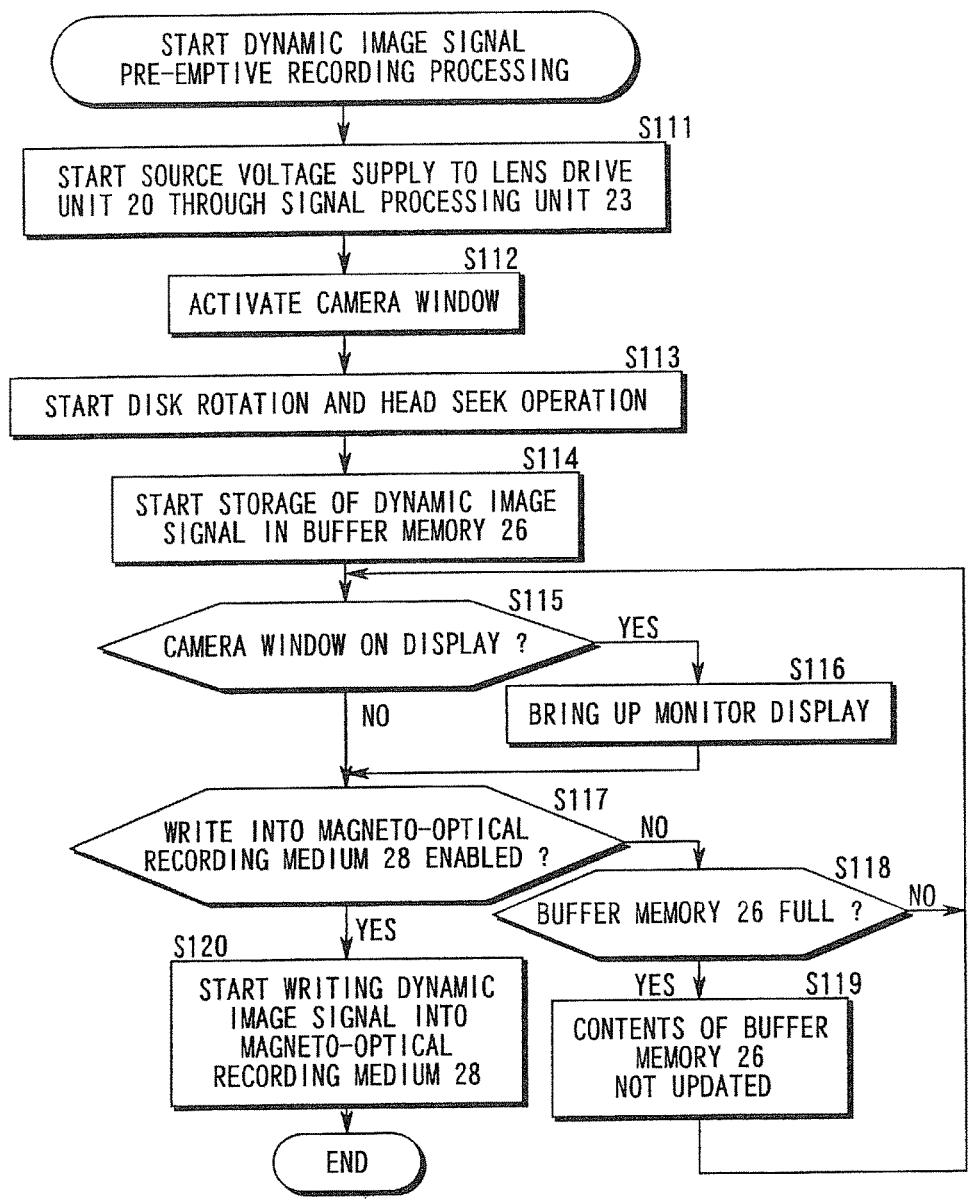
FIG. 12 is a flowchart illustrating an example of second dynamic image signal pre-emptive recording processing that is executed if the dynamic image recording button 6 is operated when the disk window is not active.

FIG. 12 presents a flowchart illustrating an example of the second dynamic image signal pre-emptive recording processing that is executed if the dynamic image recording button 6 is operated while the camera window is not on display. In this example, since the processing performed in steps S111~S118 is identical to the processing performed in S91~S98 in FIG. 11 and the processing performed in step S120 is identical to the processing performed in step S100 in FIG. 11, their explanation is omitted. When it is decided in step S118 in the flowchart in FIG. 12 that the buffer memory 26 has become full, the operation proceeds to step S119. Then, the control unit 34 returns to step S115 without updating the contents of the buffer memory 26 (without overwriting the dynamic image signal stored in the buffer memory 26 with the new dynamic image signal provided by the data compression/expansion unit 25), to execute the processing in step S115 and subsequent steps. Other aspects of the processing are identical to the processing in FIG. 11.

Figure 13:
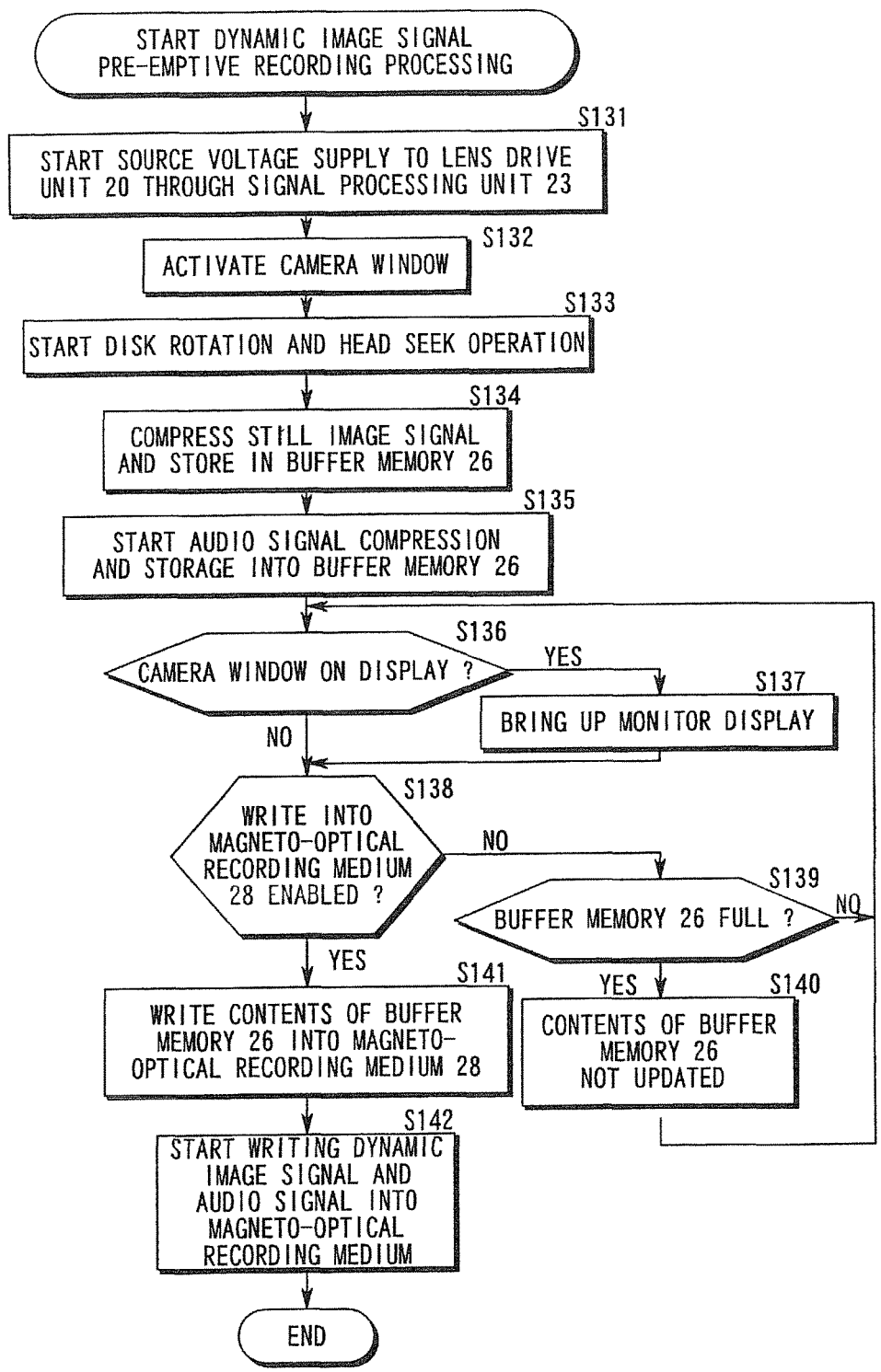
FIG. 13 is a flowchart illustrating an example of third dynamic image signal pre-emptive recording processing that is executed if the dynamic image recording button 6 is operated when the disk window is not active.

FIG. 13 presents a flowchart illustrating an example of the third dynamic image signal pre-emptive recording processing that is executed if the dynamic image recording button 6 is operated while the camera window is not on display. First, in step S131, the control unit 34 starts power supply to the lens drive unit 20~the signal processing unit 23. Then the operation proceeds to step S132 in which the control unit 34 starts camera window display. In step S133, the control unit 34 issues a command to the data access unit 27 to rotate the disk and to initiate a head seek. The operation then proceeds to step S134, in which the control unit 34 issues a command to the data compression/expansion unit 25 to compress a still image signal stored in the frame memory 24 and to store it in the buffer memory 26.

In step S135, the control unit 34 issues a command to the audio signal processing unit 32 to compress an audio signal input via the audio input/output unit 29 and the A/D conversion unit 31 and to store the compressed signal in the buffer memory 26. In step S136, the control unit 34 makes a decision as to whether or not the camera window is on display, and if it is decided that the camera window is on display, the operation proceeds to step S137. In step S137, the control unit 34 implements control of the display image creation unit 33 to perform monitor display of the dynamic image signal in the area 61 of the camera window before preceding to step S138. If the control unit 34 decides in step S136 that the camera window is not on display, the operation proceeds to step S138 in which a decision is made as to whether or not a write of various types of signals in the magneto-optical recording medium 28 has become enabled. If the control unit 34 decides in step S138 that a write in the magneto-optical recording medium 28 has not been enabled yet, the operation proceeds to step S139.

In step S139, the control unit 34 makes a decision as to whether or not the buffer memory 26 has become full. If the control unit 34 decides that the buffer memory 26 has not become full yet, the operation returns to step S136 to execute the processing in step S136 and subsequent steps. If it is decided in step S139 that the buffer memory 26 has become full, the operation proceeds to step S140 before returning to step S136 without updating the contents of the buffer memory 26 to execute the processing in step'S136 and subsequent steps.

If it is decided in step S138 that a write of various types of signals in the magneto-optical recording medium 28 has become enabled, the operation proceeds to step S141 to issue a command to the data access unit 27 to write the contents (still image signal and audio signal) stored in the buffer memory 26 in the magneto-optical recording medium 28. Then, the control unit 34 starts a write of the dynamic image signal and the audio signal in the magneto-optical recording medium 28 in step S142.

Figure 14:
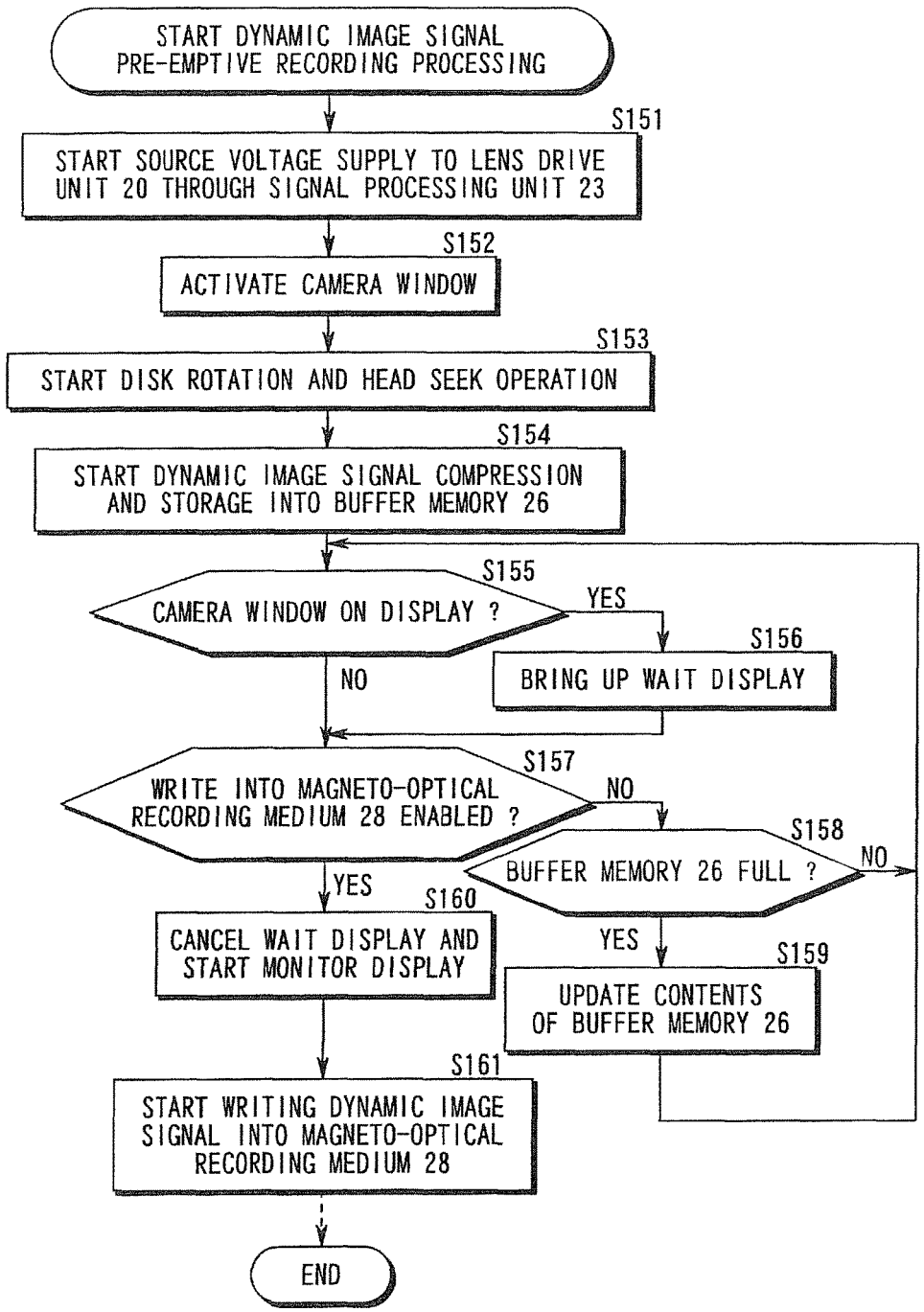
FIG. 14 is a flowchart illustrating an example of forth dynamic image signal pre-emptive recording processing that is executed if the dynamic image recording button 6 is operated when the disk window is not active.

FIG. 14 presents a flowchart illustrating an example of the fourth dynamic image signal pre-emptive recording processing that is executed it the dynamic image recording button 6 is operated while the camera window is not on display. In the flowchart in FIG. 14, the processing performed in steps S151~S155 is identical to the processing performed in steps S91~S95 in FIG. 11, and the processing performed in steps S157~S159 is identical to the processing performed in steps S97~S99 in FIG. 12. Thus, an explanation of these steps is omitted. In the flowchart in FIG. 14, if it is decided in step S155 that the camera window is on display, the operation proceeds to step S156. In step S156, the control unit 34 implements control of the display image creation unit 33 to bring up a wait display such as "preparation in progress; please wait," before proceeding to step S157. If it is decided in step S157 that a write of various types of signals in the magneto-optical recording medium 28 has been enabled, the operation proceeds to step S160. In step S160, the control unit 34 implements control of the display image creation unit 33 to cancel the wait display and to start monitor display of the dynamic image signal. Then, in step S161, the control unit 34 issues a command to the data access unit 27 to start a write of the dynamic image signal in the magneto-optical recording medium 28. Other aspects of the processing are identical to the processing illustrated in FIG. 11.

Figure 15:
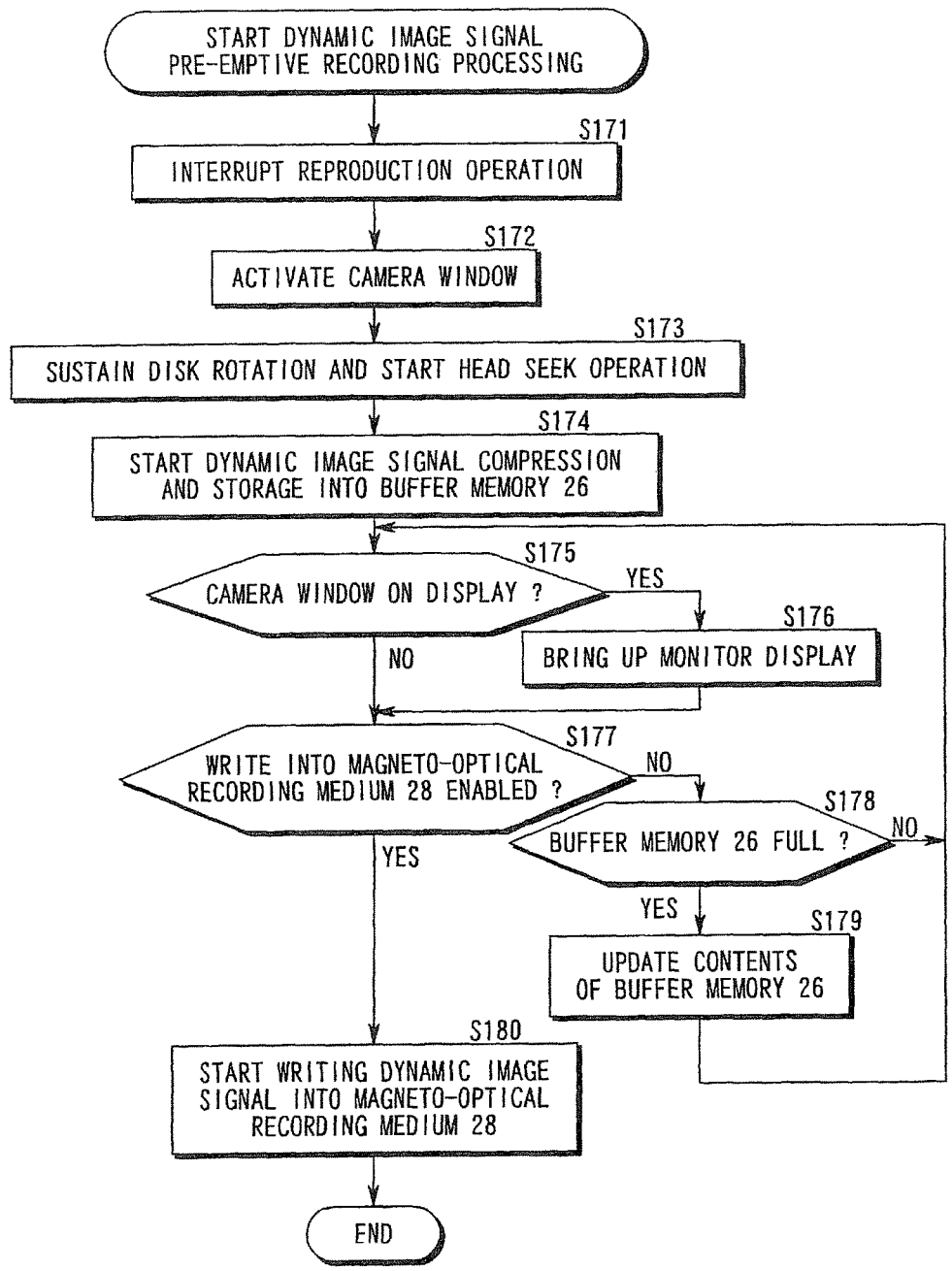
FIG. 15 is a flowchart illustrating an example of dynamic image signal pre-emptive recording processing that is executed if the dynamic image recording button is operated during a reproduction operation.

Next, in reference to the flowchart in FIG. 15, an example of the dynamic image signal pre-emptive recording processing that is executed if the dynamic image recording button 6 is operated during a reproduction operation is explained. In this example, since the processing performed in steps S174~S180 corresponds to the processing performed in steps S94~S100 in FIG. 11, its explanation is omitted. In step S171, the control unit 34 interrupts the reproduction operation and starts display of the camera window in step S172. In step S173, the control unit 34 issues a command to the data access unit 27 to sustain the rotation of the disk for reproduction and to initiate a head seek to locate a position where recording is enabled. The processing that is performed subsequently is identical to that in FIG. 11.

Figure 16:
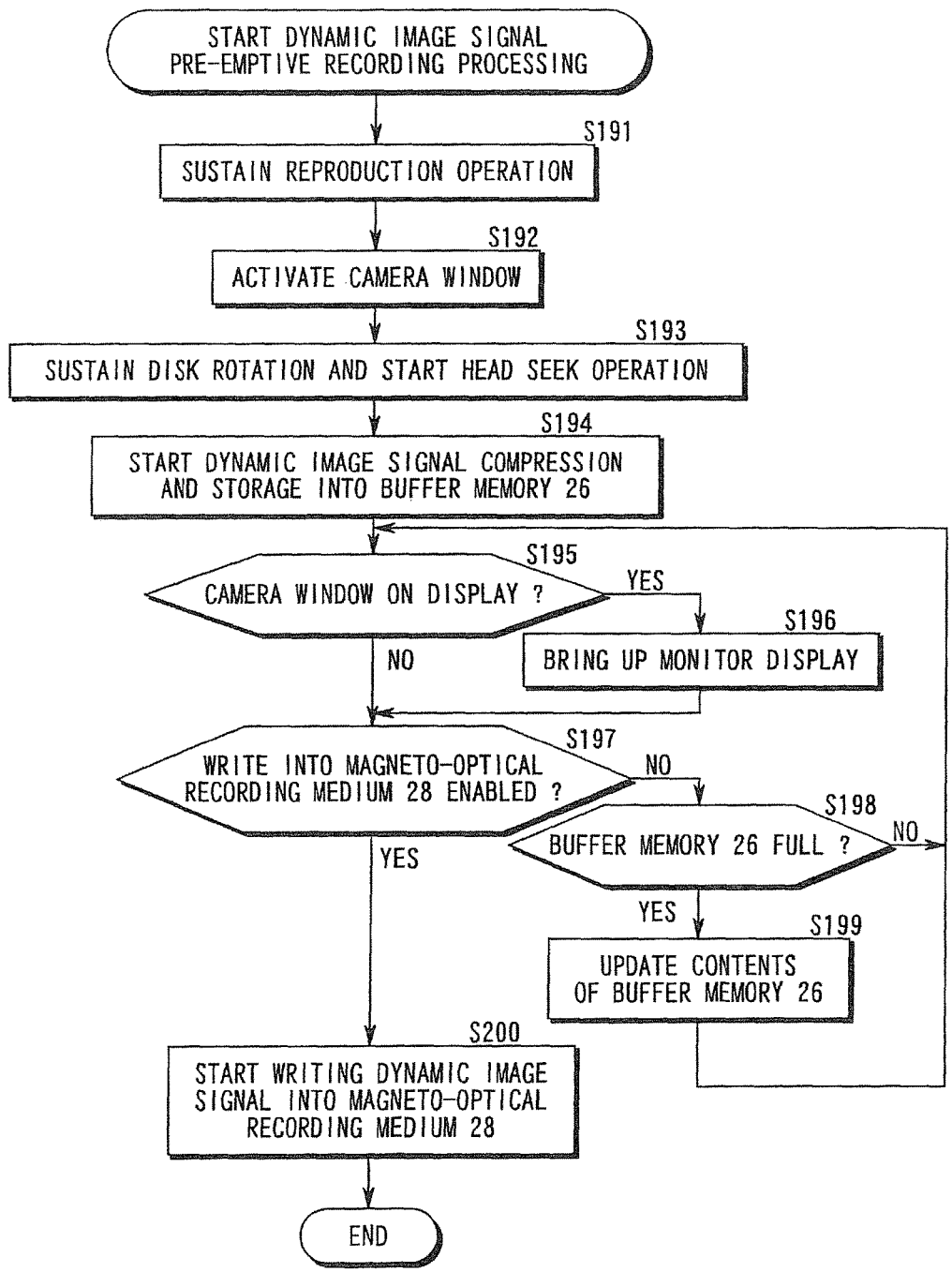
FIG. 16 is a flowchart illustrating another example of dynamic image signal pre-emptive recording processing that is executed if the dynamic image recording button is operated during a reproduction operation.

Next, in reference to the flowchart in FIG. 16, an example of the dynamic image signal pre-emptive recording processing that is executed if the dynamic image recording button 6 is operated during a reproduction operation is explained. Since the processing performed in steps S194-S200 in the example illustrated in FIG. 16 is identical to the processing performed in steps S94~S100 in FIG. 11, its explanation is omitted. In step S191, the control unit 34 sustains the reproduction operation, and in step S192, it starts display of the camera window. In step S193, the control unit 34 issues a command to the data access unit 27 to perform a seek operation to position the head at a track on the disk where recording is enabled. While other aspects of the processing are identical to those in the processing illustrated in FIG. 11, the reproduction operation and the recording operation are executed alternately through time-sharing. It is to be noted that instead of executing the reproduction operation and the recording operation through time-sharing, two heads, one for recording and the other for reproduction, may be provided at the data access unit 27 to perform recording and reproduction at the same time using these two heads.

Figure 17:
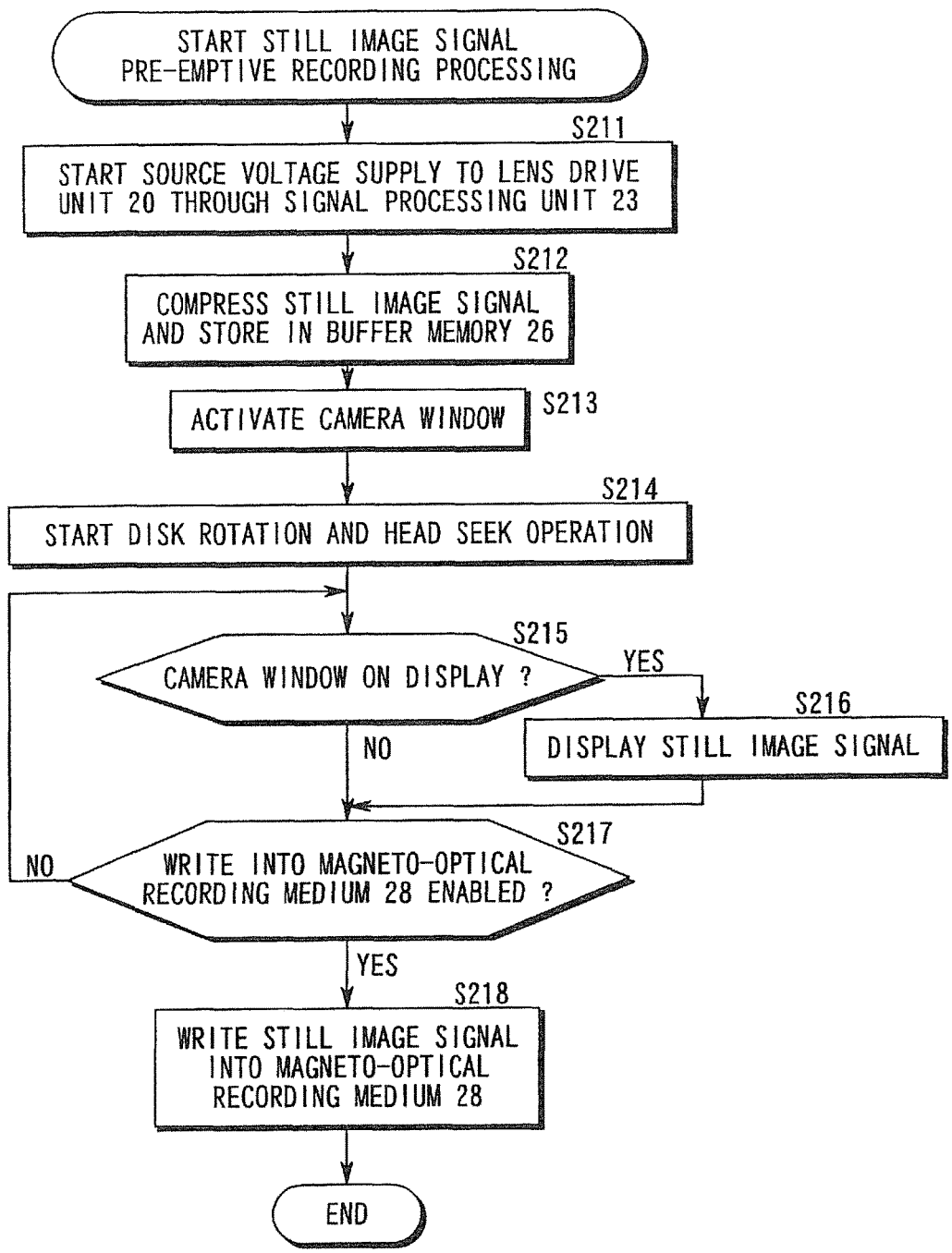
FIG. 17 is a flowchart illustrating an example of still image signal pre-emptive recording processing that is executed if the still image recording button 7 is operated when the disk window is not active.

Next, in reference to the flowchart in FIG. 17, an example of the still image signal pre-emptive recording processing that is executed if the still image recording button 7 is operated while the camera window is not on display is explained. First, in step S211, the control unit 34 starts supplying a source voltage to the lens drive unit 20~the signal processing unit 23. Thus, the operations at the various units start, and still image signal sampled with specific timing are stored in the frame memory 24. In step S212, the control unit 34 issues a command to the data compression/expansion unit 25 to read out the still image signal stored in the frame memory 24, to compress it and to store it in the buffer memory 26. Then, the operation proceeds to step S213, in which the control unit 34 starts display of the camera window. In step S214, the control unit 34 issues a control signal to the data access unit 27 to rotate the disk constituting the magneto-optical recording medium 28 and to initiate a seek operation to position the head at a track on the disk where recording is enabled. In step S215, the control unit 34 makes a decision as to whether or not the camera window is on display and if it is decided that the camera window is on display, the operation proceeds to step S216. In step S216, the control unit 34 implements control of the display image creation unit 33 to display a still image signal in the area 61 of the camera window before the operation proceeds to step S217. If the control unit 34 decides in step 215 that the camera window is not on display, the operation proceeds to step S217. In step S217, the control unit 34 makes a decision as to whether or not a write of the still image signal in the magneto-optical recording medium 28 has become enabled. If the control unit 34 decides that a write in the magneto-optical recording medium 28 has not become enabled yet (the disk constituting the magneto-optical recording medium 28 has not reached the steady rotating rate or the head is not at a recording-enabled position), the operation returns to step S215 to execute the processing in step S215 and subsequent steps.

If the control unit 34 decides in step S217 that a write of the still image signal in the magneto-optical recording medium 28 has become enabled, the operation proceeds to step S218, in which the control unit 34 issues a command to the data access unit 27 to write the still image signal in the magneto-optical recording medium 28.

Figure 18:
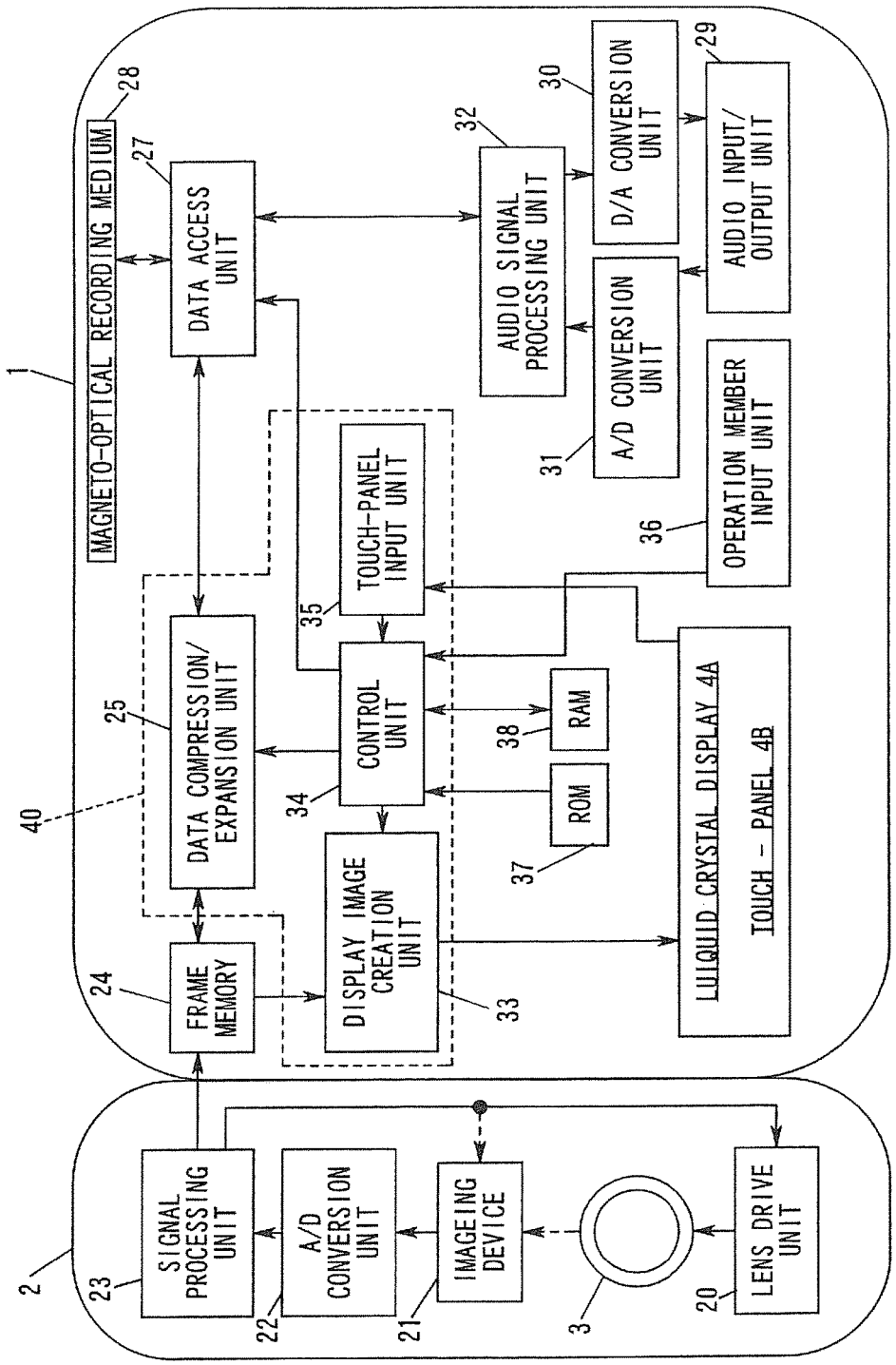
FIG. 18 is a block diagram illustrating another structural example of the movie camera in FIG. 3.

FIG. 18 is a block diagram illustrating another structural example of the movie camera in FIG. 3, with the same reference numbers assigned to components identical to those in FIG. 3 to preclude the necessity for an explanation thereof. In the example in FIG. 18, the buffer memory 26 in FIG. 3 is not included. In other words, signals are transmitted and received directly between the data compression/expansion unit 25 and the data access unit 27 or between the audio signal processing unit 32 and the data access unit 27. Other structural features are identical to those in FIG. 3.

FIG. 19 presents a flowchart illustrating an example of the dynamic image signal pre-emptive recording processing that is executed if the dynamic image recording button is operated while the camera window is not on display in the movie camera illustrated in FIG. 18. In the example illustrated in FIG. 19, since the processing performed in steps S301~S305 is identical to the processing performed in steps S91~S95 in FIG. 11 and the processing performed in step S307 is identical to the processing performed in step S97 in FIG. 11, their explanation is omitted. If it is decided in step S305 that the camera window is on display, the operation proceeds to step S306. In step S306, the control unit 34 implements control of the display image creation unit 33 to bring up a wait display such as "preparation for recording in progress; please wait," before preceding to step S307. If the control unit 34 decides in step S307 that a write of dynamic image signal in the magneto-optical recording medium 28 has become enabled, the operation proceeds to step S308, in which the control unit 34 implements control of the display image creation unit 33 to cancel the wait display and to start monitor display of a dynamic image signal stored in the frame memory 24. In step S309, the control unit 34 issues a command to the data access unit 27 to start a write of the dynamic image signal in the magneto-optical recording medium 28. Other aspects of the processing are identical to those in FIG. 11.

It is to be noted that the explanation has been given on processing in which pre-emptive recording of dynamic images is performed in reference to the individual embodiments described above. The present invention may be adopted when implementing processing in which pre-emptive recording of still images is performed as well as dynamic images. Pre-emptive recording of still images is started when the still image recording button 7 is operated while a reproduction operation is in progress. The pre-emptive recording of still images is implemented by adopting a processing similar to that for the dynamic image pre-emptive recording described above. However, when implementing pre-emptive recording of still images, the contents of the buffer memory 26 do not need to be updated even when the buffer memory 26 has become full. In addition, when the buffer memory 26 has become full, a warning may be displayed to the effect that any further pre-emptive recording of still images cannot be performed.

In addition, in each of the embodiments described above, the control unit 34 may select a signal to be stored in the buffer memory 26, among a dynamic image signal, a still image signal and an audio signal, in correspondence to the length of time to elapse before a recording-enabled state is achieved, the capacity at the buffer memory 26 or the battery state until the magneto-optical recording medium 28 enters a recording-enabled state.

In reference to the embodiments, a camera that is provided with four recording buttons, i.e., the dynamic image recording button and the still image recording button operated through the touch-panel provided on the screen of the display apparatus and the dynamic image recording button and still image recording button provided at locations other than the location of the touch-panel installation, has been explained. However, it is not necessary to provide all four of these recording buttons. For instance, the button that is operated through the touch-panel may be used as a dynamic image recording button, with a button provided at a position other than the location of the touch-panel installation made to function as a still image recording button. Or the reverse of this arrangement and a button operated through the touch-panel being a still image recording button with a button provided at a position other than the location of the touch-panel installation functioning as a dynamic image recording button may be assumed. By adopting such a structure, a reduction in the number of parts is achieved.

The image signal recording/reproduction apparatus and the method of image signal recording/reproduction that have been explained in reference to FIGS. 1-19 achieve the following advantage. Namely, when a command for recording is issued while the reproduction apparatus is engaged in reproduction of a dynamic image signal or a still image signal, a command is issued to the recording apparatus to start recording a dynamic image signal or a still image signal while sustaining the mechanical drive of the recording medium. Consequently, even while the movie camera is engaged in a reproduction operation, for instance, a pre-emptive recording of an image can be started.

In addition, in the image signal recording apparatus that has been explained in reference to FIGS. 1~19, an image signal recording start can be prompted by the first instruction device provided on the screen of the display apparatus or by the second instruction device provided at a position other than the installation position of the first instruction device. Thus, an image signal recording start can be instructed by either of the instruction device depending upon the operating state to achieve a prompt start of image signal recording. Furthermore, since image signal recording can be started by using the second instruction device even in a state in which a recording start cannot be prompted by the first instruction device, image recording can be started without delay.

What is claimed is:

1. An apparatus, comprising:
    an imaging element that captures an image of a subject to be taken and outputs image data based on the image;
    a displaying unit that displays the image data in a display area, the display area being configured to receive an operation;
    a first instruction member that is arranged at a position different from the display area;
    a second instruction member, different from the first instruction member, that is arranged at a position different from the display area;
    a recording control unit that records dynamic image data or still image data in response to receiving the operation executed on the display area, records dynamic image data in response to an operation on the first instruction member, and records still image data in response to an operation on the second instruction member; and
    a control unit that switches a state where the dynamic image data or the still image data is not recorded even if the operation executed on the display area has been received, into a state where the dynamic image data or the still image data is recorded in response to receiving the operation executed on the display area, by receiving an operation on a predetermined image displayed in the displayed area.

2. The apparatus as set forth in claim 1,
    wherein the second instruction member is arranged at a surface different from a surface of the first instruction member.

3. The apparatus as set forth in claim 1,
wherein the first instruction member and the displaying unit are arranged at a surface different from a surface at which the second instruction member is arranged.

4. The apparatus as set forth in claim 3,
wherein the first instruction member and the displaying unit are arranged at the same surface.

5. The apparatus as set forth in claim 1,
wherein the first instruction member and the displaying unit are not arranged at the surface at which the second instruction member is arranged.

6. The apparatus as set forth in claim 1, wherein
the display area is a touch panel that receives the operation.

7. The apparatus as set forth in claim 1, wherein
the display area includes a first area that displays the image data and a second area that receives the operation.

8. The apparatus as set forth in claim 7, wherein
the first area and the second area are arranged side by side on the display area.

9. The apparatus as set forth in claim 1, further comprising a mode setting, wherein:
when the mode setting indicates still image recording, the recording control unit records still image data after receiving the operation; and
when the mode setting indicates dynamic image recording, the recording control unit records dynamic image data after receiving the operation.

10. The apparatus as set forth in claim 7, wherein:
the second area includes a third area and a forth area;
when the third area receives the operation, the recording control unit records still image data; and
when the fourth area receives the operation, the recording control unit records dynamic image data.

11. The apparatus as set forth in claim 1, wherein the recording control unit records dynamic image data or still image data after receiving the operation based on a predetermined mode setting of dynamic image recording or still image recording.

12. The apparatus according to claim 1, wherein:
the recording control unit records the dynamic image data in response to the operation on the first instruction member even in the state where the dynamic image data or the still image data is not recorded even if the operation executed on the display area has been received.

13. An apparatus, comprising:
an imaging element that captures an image of a subject to be taken and outputs image data based on the image;
a display unit that displays the data in a display area;
a first instruction member that is arranged at a position different from the display area;
a second instruction member, different from the first instruction member, that is arranged at a position different from the display area;
a third instruction member that is configured as a transparent touch-screen provided on the display area of the displaying unit;
a recording control unit that records dynamic image data or still image data in response to an operation on the third instruction member, records dynamic image data in response to an operation on the first instruction member, and records still image data in response to an operation on the second instruction member; and
a control unit that switches a state where the dynamic image data or the still image data is not recorded even if the operation executed on the display area has been received, into a state where the dynamic image data or the still image data is recorded in response to receiving the operation executed on the display area, by receiving an operation on a predetermined image displayed in the displayed area.

14. The apparatus according to claim 13, wherein:
the recording control unit records the dynamic image data in response to the operation on the first instruction member even in the state where the dynamic image data or the still image data is not recorded even if the operation executed on the display area has been received.

* * * * *